US012803213B2

(12) United States Patent
Ramsey et al.

(10) Patent No.: US 12,803,213 B2
(45) Date of Patent: Nov. 17, 2026

(54) LOCKING COMBINATION OUTLET MODULE AND POWER DISTRIBUTION UNIT INCORPORATING THE SAME

(71) Applicant: Legrand DPC, LLC, West Hartford, CT (US)

(72) Inventors: Mark Ramsey, Reno, NV (US); Dominic Barker, Reno, NV (US)

(73) Assignee: Legrand DPC LLC, West Hartford, CT (US)

( * ) Notice: Subject to any disclaimer, the term of this patent is extended or adjusted under 35 U.S.C. 154(b) by 0 days.

(21) Appl. No.: 18/441,950

(22) Filed: Feb. 14, 2024

(65) Prior Publication Data

US 2025/0158318 A1 May 15, 2025

Related U.S. Application Data

(63) Continuation of application No. 17/543,189, filed on Dec. 6, 2021, now Pat. No. 11,936,130, which is a continuation of application No. 16/819,568, filed on Mar. 16, 2020, now Pat. No. 11,196,212.

(51) Int. Cl.

| | |
|---|---|
| ***H01R 13/518*** | (2006.01) |
| ***H01R 13/35*** | (2006.01) |
| ***H01R 13/627*** | (2006.01) |

(52) U.S. Cl.
CPC ....... *H01R 13/518* (2013.01); *H01R 13/6275* (2013.01); *H01R 13/35* (2013.01)

(58) Field of Classification Search
CPC ...... H01R 13/35; H01R 13/518; H01R 13/62; H01R 13/6275; H01R 13/639; H01R 13/6395; H01R 25/006
See application file for complete search history.

(56) References Cited

U.S. PATENT DOCUMENTS

| | | | |
|---|---|---|---|
| 3,576,520 | A | 4/1971 | Stauffer |
| RE29,780 | E | 9/1978 | Rutkowski |
| 4,349,176 | A | 9/1982 | Thornton |
| D279,285 | S | 6/1985 | Schwartz |

(Continued)

FOREIGN PATENT DOCUMENTS

| | | |
|---|---|---|
| CN | 101673902 A | 3/2010 |
| DE | 202016101189 U1 | 3/2016 |

(Continued)

OTHER PUBLICATIONS

International Search Report and Written Opinion received for International Patent Application No. PCT/ US2021/022479, mailed on Apr. 30, 2021, 10 pages.

(Continued)

*Primary Examiner* — Oscar C Jimenez
(74) *Attorney, Agent, or Firm* — Adams & Reese LLP

(57) ABSTRACT

An outlet module including a module housing comprising a base surface and a sidewall extending therefrom to at least partially surround an interior region. Multiple outlet cores extend from the base surface and at least one latch lever is pivotably coupled to the sidewall and adjacent a corresponding one of the multiple outlet cores. The latch lever is moveable between a first position, wherein the at least one latch lever is capable of engaging a mating plug and a second position, wherein the at least one latch lever is disengaged from the plug.

27 Claims, 19 Drawing Sheets

(56) References Cited

U.S. PATENT DOCUMENTS

| | | | |
|---|---|---|---|
| 4,531,795 | A | 7/1985 | Sinclair |
| 4,995,821 | A | 2/1991 | Casey |
| 5,057,029 | A | 10/1991 | Noorily |
| 5,328,388 | A | 7/1994 | Fust et al. |
| 6,102,727 | A | 8/2000 | Kawaguchi et al. |
| 6,126,474 | A | 10/2000 | Doye et al. |
| 6,250,956 | B1 | 6/2001 | Pulizzi |
| D462,056 | S | 8/2002 | Chung |
| D469,062 | S | 1/2003 | Nieto et al. |
| 6,755,680 | B2 | 6/2004 | Okamura et al. |
| 7,094,077 | B1 | 8/2006 | Chen |
| D543,941 | S | 6/2007 | Hargreaves et al. |
| D544,840 | S | 6/2007 | Hargreaves et al. |
| D545,764 | S | 7/2007 | Allison |
| D610,092 | S | 2/2010 | Jimenez et al. |
| D627,731 | S | 11/2010 | Huang et al. |
| D636,336 | S | 4/2011 | Clark |
| 7,922,532 | B2 | 4/2011 | Su et al. |
| 8,033,867 | B1 | 10/2011 | Kessler et al. |
| 8,052,437 | B2 | 11/2011 | Jiang et al. |
| 8,212,388 | B2 | 7/2012 | Langgood et al. |
| 8,283,802 | B2 | 10/2012 | Jansma et al. |
| 8,328,579 | B2 | 12/2012 | Sasaki et al. |
| 8,469,730 | B2 | 6/2013 | Garb et al. |
| 8,469,734 | B2 | 6/2013 | Chen |
| D687,778 | S | 8/2013 | Utz |
| D701,836 | S | 4/2014 | Byrne |
| 8,708,750 | B2 | 4/2014 | Ho |
| 8,784,126 | B2 | 7/2014 | Chang |
| 8,979,592 | B2 | 3/2015 | Dang |
| D730,834 | S | 6/2015 | Byrne et al. |
| 9,054,449 | B2 | 6/2015 | Utz et al. |
| 9,226,414 | B2 | 12/2015 | Weeks et al. |
| 9,270,054 | B2 | 2/2016 | Beltzer |
| 9,362,682 | B2 | 6/2016 | Chien et al. |
| 9,484,692 | B2 | 11/2016 | Irons |
| 9,509,086 | B2 | 11/2016 | Utz et al. |
| 9,531,126 | B2 | 12/2016 | Krietzman et al. |
| D780,122 | S | 2/2017 | Irons et al. |
| 9,583,902 | B2 | 2/2017 | Irons et al. |
| 9,614,335 | B2 | 4/2017 | Irons |
| 9,627,828 | B2 | 4/2017 | Irons |
| 9,735,502 | B2 | 8/2017 | Stevens et al. |
| 9,837,753 | B1 | 12/2017 | Chen |
| 9,843,146 | B1 | 12/2017 | Chen |
| 9,851,380 | B2 | 12/2017 | Soneda et al. |
| D809,461 | S | 2/2018 | Maskaly et al. |
| D815,045 | S | 4/2018 | Horn et al. |
| 9,991,633 | B2 | 6/2018 | Robinet |
| 10,003,163 | B2 | 6/2018 | Hewitt et al. |
| 10,199,772 | B2 | 2/2019 | Kim |
| 10,205,281 | B2 | 2/2019 | Preuss et al. |
| 10,249,998 | B2 | 4/2019 | Irons et al. |
| 10,297,995 | B2 | 5/2019 | Weeks et al. |
| 10,424,884 | B2 | 9/2019 | Irons et al. |
| 10,424,885 | B2 | 9/2019 | Irons |
| 10,424,886 | B1 | 9/2019 | Irons |
| 10,498,069 | B2 | 12/2019 | Jeon-Haurand |
| 10,498,096 | B2 | 12/2019 | Irons et al. |
| 10,541,501 | B2 | 1/2020 | Hutchison et al. |
| 10,547,145 | B2 | 1/2020 | Bowen et al. |
| D879,720 | S | 3/2020 | Gao |
| 10,680,398 | B1 | 6/2020 | Irons et al. |
| 11,196,212 | B2 | 12/2021 | Ramsey et al. |
| 2001/0027054 | A1 | 10/2001 | Fukuda |
| 2002/0022406 | A1 | 2/2002 | Hutchison |
| 2004/0077203 | A1 | 4/2004 | Dewitt et al. |
| 2007/0149020 | A1 | 6/2007 | Matsumoto |
| 2008/0076291 | A1 | 3/2008 | Ewing et al. |
| 2009/0141477 | A1 | 6/2009 | Bhosale et al. |
| 2010/0062653 | A1 | 3/2010 | Mao et al. |
| 2010/0117453 | A1 | 5/2010 | Langgood et al. |
| 2011/0187348 | A1 | 8/2011 | Soneda et al. |
| 2011/0223784 | A1 | 9/2011 | Jiang et al. |
| 2011/0223785 | A1 | 9/2011 | Jiang et al. |
| 2011/0256750 | A1 | 10/2011 | Chen |
| 2011/0320849 | A1 | 12/2011 | Cochran et al. |
| 2012/0081842 | A1 | 4/2012 | Ewing et al. |
| 2013/0094811 | A1 | 4/2013 | Rossman |
| 2013/0095691 | A1 | 4/2013 | Blanton |
| 2013/0097812 | A1 | 4/2013 | Sanders et al. |
| 2013/0109213 | A1 | 5/2013 | Chang |
| 2013/0143428 | A1 | 6/2013 | Chang |
| 2013/0157495 | A1 | 6/2013 | Chang |
| 2013/0244468 | A1 | 9/2013 | Chang |
| 2014/0041894 | A1 | 2/2014 | Wang |
| 2014/0098969 | A1 | 4/2014 | Oliveira |
| 2014/0126116 | A1 | 5/2014 | Irons |
| 2015/0104968 | A1 | 4/2015 | Hutchison et al. |
| 2015/0214683 | A1 | 7/2015 | Irons |
| 2015/0357758 | A1 | 12/2015 | Krietzman et al. |
| 2016/0365671 | A1 | 12/2016 | Stevens et al. |
| 2017/0170600 | A1* | 6/2017 | Tezgurler ........... H01R 13/6275 |
| 2017/0354053 | A1 | 12/2017 | Irons et al. |
| 2018/0054030 | A1 | 2/2018 | Hewitt et al. |
| 2018/0351299 | A1 | 12/2018 | Kim |
| 2019/0140410 | A1 | 5/2019 | Hutchison et al. |
| 2019/0245305 | A1 | 8/2019 | Bowen et al. |
| 2019/0319413 | A1 | 10/2019 | Bhakta et al. |
| 2021/0028576 | A1 | 1/2021 | Germagian et al. |

FOREIGN PATENT DOCUMENTS

| | | | |
|---|---|---|---|
| GB | 2303257 | A | 2/1997 |
| JP | H04230977 | A | 8/1992 |

OTHER PUBLICATIONS

International preliminary report on patentability received for International Patent Application No. PCT/US2021/022479, mailed on Sep. 29, 2022, 09 pages.

Partial Supplementary European Search Report received for European Patent Application No. 21770884.1, mailed on Feb. 27, 2024, 15 pages.

Extended European Search Report received for European Patent Application No. 21770884.1, mailed on Jul. 18, 2024, 16 pages.

Office action received for Indian Patent Application No. 202217054643, mailed on May 22, 2025, 07 pages.

Chinese Office Action received for Chinese Patent Application 202180035810.9, issued on Jul. 28, 2026; 16 Pages; with rough English translations.

* cited by examiner

LOCKING COMBINATION OUTLET MODULE AND POWER DISTRIBUTION UNIT INCORPORATING THE SAME

CROSS-REFERENCE TO RELATED APPLICATION(S)

This application is a continuation of U.S. application Ser. No. 17/543,189, filed Dec. 6, 2021, titled "LOCKING COMBINATION OUTLET MODULE AND POWER DISTRIBUTION UNIT INCORPORATING THE SAME", which is a continuation of U.S. application Ser. No. 16/819,568, now, U.S. Pat. No. 11,196,212, filed Mar. 16, 2020, titled "LOCKING COMBINATION OUTLET MODULE AND POWER DISTRIBUTION UNIT INCORPORATING THE SAME", the disclosure of which are incorporated herein by reference in their entirety.

TECHNICAL FIELD

The present disclosure is generally directed to outlet modules, and particularly modules that include locking features and those that can accommodate multiple plug types. More specifically the disclosure is directed to power distribution units incorporating one or more such modules.

BACKGROUND

A conventional power distribution unit (PDU) is an assembly of electrical outlets (also called receptacles) that receive electrical power from a source and distribute the electrical power to one or more separate electronic appliances. Each such PDU assembly has a power input that receives power from one or more power sources, and power outlets that may be used to provide power to one or more electronic appliances. PDUs are used in many applications and settings such as, for example, in or on electronic equipment racks.

A common use of PDUs is supplying operating power for electrical equipment in computing facilities, such as enterprise data centers, multi-tenant hosting environments like colocation facilities, cloud computing, and other data center types. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices (e.g., network switches, routers, servers and the like) are mounted vertically, one on top of the other, in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

Various different equipment racks may have different configurations, including different locations of and different densities of equipment within the racks. Equipment in modern data center racks, most commonly servers, storage, and networking devices, typically have C14 or C20 plugs, requiring C13 or C19 outlets on a corresponding rack's PDU. There is often a mixture of how many and where on the PDU each C13 or C19 outlet is positioned in order to best match the equipment. PDU equipment suppliers commonly manufacture many variations of PDU's that have different mixes of C13 and C19 outlet configurations to meet the demands of the data center market. It is also common for the servers, storage, and network equipment to be changed every three to five years, which then may require a different outlet configuration on the PDU.

Enterprise data centers, multi-tenant hosting environments like colocation facilities, cloud computing, and other data center types are often critical for business operations. Therefore, it is important that the electrical connections between a PDU and its associated servers, storage, and network equipment is secure in order to maintain equipment up time to reliably support the enterprise users.

SUMMARY

Locking combination outlet modules and PDUs incorporating those modules are disclosed herein. The disclosed locking modules provide flexibility in connecting to various combinations of e.g., C13 and C19 outlets, as well as securing those connections against being inadvertently disconnected. In a representative embodiment, an outlet module can comprise a module housing having a base surface and a sidewall extending therefrom to at least partially surround an interior region. Multiple outlet cores can extend from the base surface and at least one latch lever is pivotably coupled to the sidewall and adjacent a corresponding one of the multiple outlet cores. The latch lever is movable between a first position, wherein the at least one latch lever is capable of engaging a mating plug and a second position, wherein the at least one latch lever is disengaged from the plug.

In another representative embodiment, an outlet module can comprise a module housing having a base surface and a sidewall extending therefrom to at least partially surround an interior region, wherein at least the base surface and the sidewall comprise an integrally molded unitary body. Multiple outlet cores can extend from the base surface with multiple latch levers pivotably coupled to the sidewall outside the interior region. Each latch lever can be positioned adjacent a corresponding one of the multiple outlet cores and movable between a latch position and an unlatch position. Multiple resilient members are each positioned between the sidewall and a corresponding one of the multiple latch levers to bias the corresponding latch lever toward the latch position.

In a further representative embodiment, a power distribution unit can comprise a housing, a power input coupled with the housing and connectable to an external power source, and at least one outlet module located at least partially within the housing and connected to the power input. The outlet module can include a module housing comprising a base surface and a sidewall extending therefrom to at least partially surround an interior region. Multiple outlet cores can extend from the base surface. Multiple latch levers can be pivotably coupled to the sidewall outside the interior region, wherein each latch lever is positioned adjacent a corresponding one of the multiple outlet cores and moveable between an unlatch position and a latch position. The latch levers are positioned to engage a mating plug when the latch lever is in the latch position.

In one aspect of the disclosed technology, each of the multiple latch levers pivots about a common pivot shaft. In some embodiments, each latch lever pivots about its own individual shaft. In another aspect of the disclosed technology, each of the multiple outlet cores can comprise a separate outlet core fastened to the base surface. In a further aspect of the disclosed technology, at least the base surface and the sidewall can comprise an integrally molded unitary body. In yet another aspect of the disclosed technology, the at least one latch lever can further comprise a tooth portion extending into the interior region and positioned to engage a mating plug when the at least one latch lever is in the latch position. In one aspect of the disclosed technology, the module can further comprise a resilient member, e.g., a compression spring, positioned between the sidewall and the at least one latch lever to bias the at least one latch lever toward the latch position. In another aspect of the disclosed technology, the at least one latch lever can comprise a release tab, a tooth portion, a pivot bore positioned therebetween, and wherein the resilient member is positioned between the release tab and the pivot bore. In one aspect of the disclosed technology, the multiple outlet cores can comprise at least one IEC C13 outlet core.

In one aspect of the disclosed technology, the multiple outlet cores can comprise at least one combination outlet core having a plurality of apertures configured to receive mating terminals corresponding to both an IEC C14 connector and an IEC C20 connector, the combination outlet core having an outer surface configured to mate with an IEC C14 connector, and a plurality of electrical terminals each positioned in a corresponding one of the apertures and configured to connect with the mating terminals corresponding to both an IEC C14 connector and an IEC C20 connector. In a further aspect of the disclosed technology, the plurality of apertures can each comprise at least two intersecting cross-wise slots. In yet another aspect of the disclosed technology, the plurality of apertures can each have a T-shaped configuration.

The foregoing has outlined rather broadly the features and technical advantages of examples according to the disclosure in order that the detailed description that follows may be better understood. Additional features and advantages will be described hereinafter. The concepts and specific examples disclosed herein may be readily used as a basis for modifying or designing other structures for carrying out the same or similar purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present technology may be realized by reference to the following drawings. In the appended figures, similar components or features may have the same reference label.

DETAILED DESCRIPTION

This description provides examples, and is not intended to unnecessarily limit the scope, applicability or configuration of the invention. Rather, the ensuing description will provide those skilled in the art with an enabling description for implementing embodiments of the invention. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Figure 1:
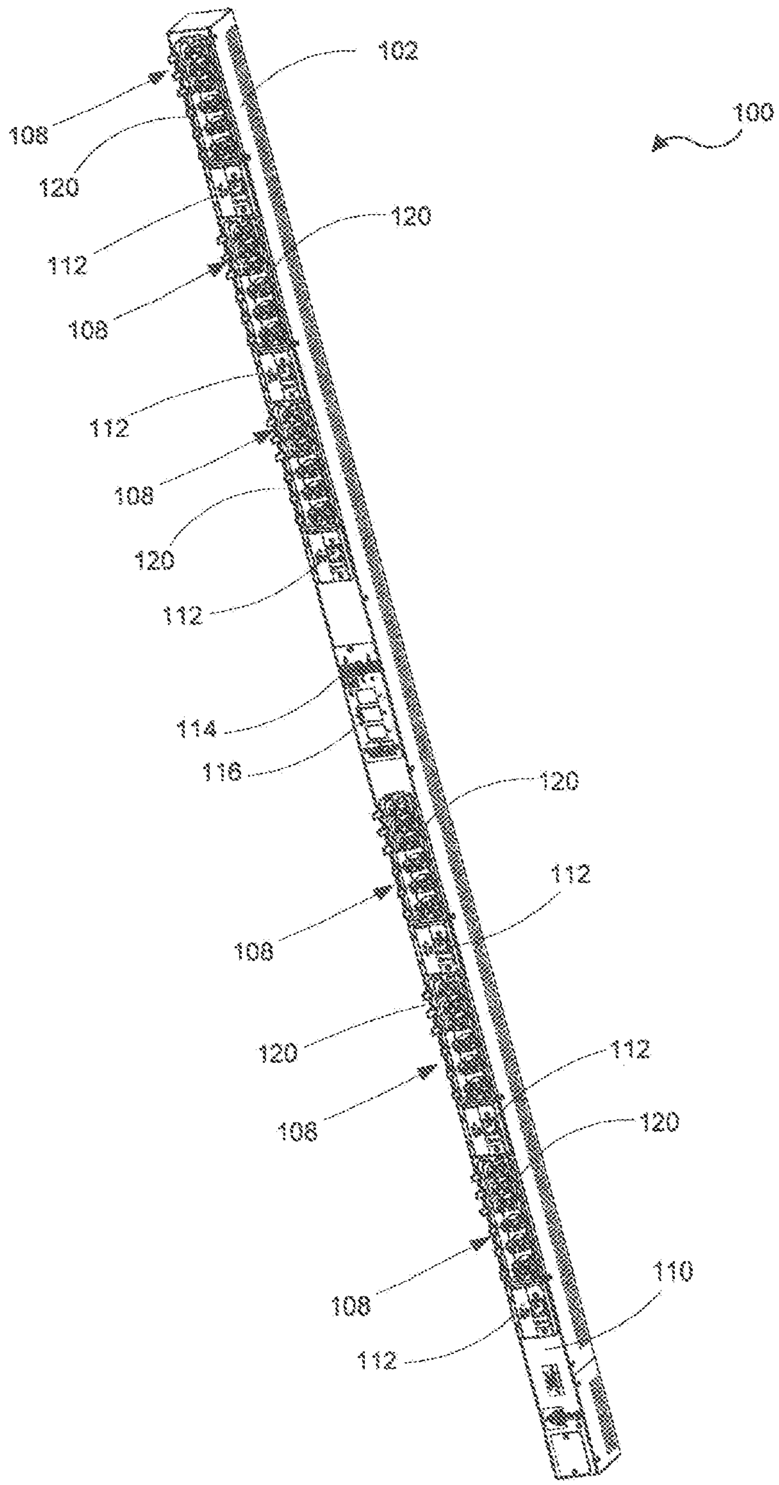
FIG. 1 is an illustration of a power distribution unit incorporating locking combination outlet modules in accordance with an embodiment of the disclosed technology.

FIG. 1 is an illustration of a representative PDU 100 of an embodiment that includes various features of the present disclosure. The PDU 100 includes a PDU housing 102 configured to receive a power input which may be connected to an external power source. The PDU 100 according to this embodiment includes housing 102 that is vertically mountable in an equipment rack, although it will be understood that other form factors may be used, such as a horizontally mountable housing. A plurality of locking combination outlet modules 120 may be located at least partially within the housing 102 through openings 108 in a front face 110 of the housing 102. The outlet modules 120 will be described in more detail below. The PDU 100 of FIG. 1 can include a suitable number of circuit protection devices, such as circuit breakers 112, that provide over-current protection for one or more associated outlet modules 120. The PDU 100 can also include a communications module 114 that may be couple-able with one or more of a local computer, local computer network, and/or remote computer network. A display portion 116 may be used to provide a local display of information related to current operating parameters of the PDU 100, such as the quantity of current being provided by the input and/or flowing through one or more of the outlets, or the power or energy consumed by one or more outlets of the PDU, to name a few.

Figure 2:
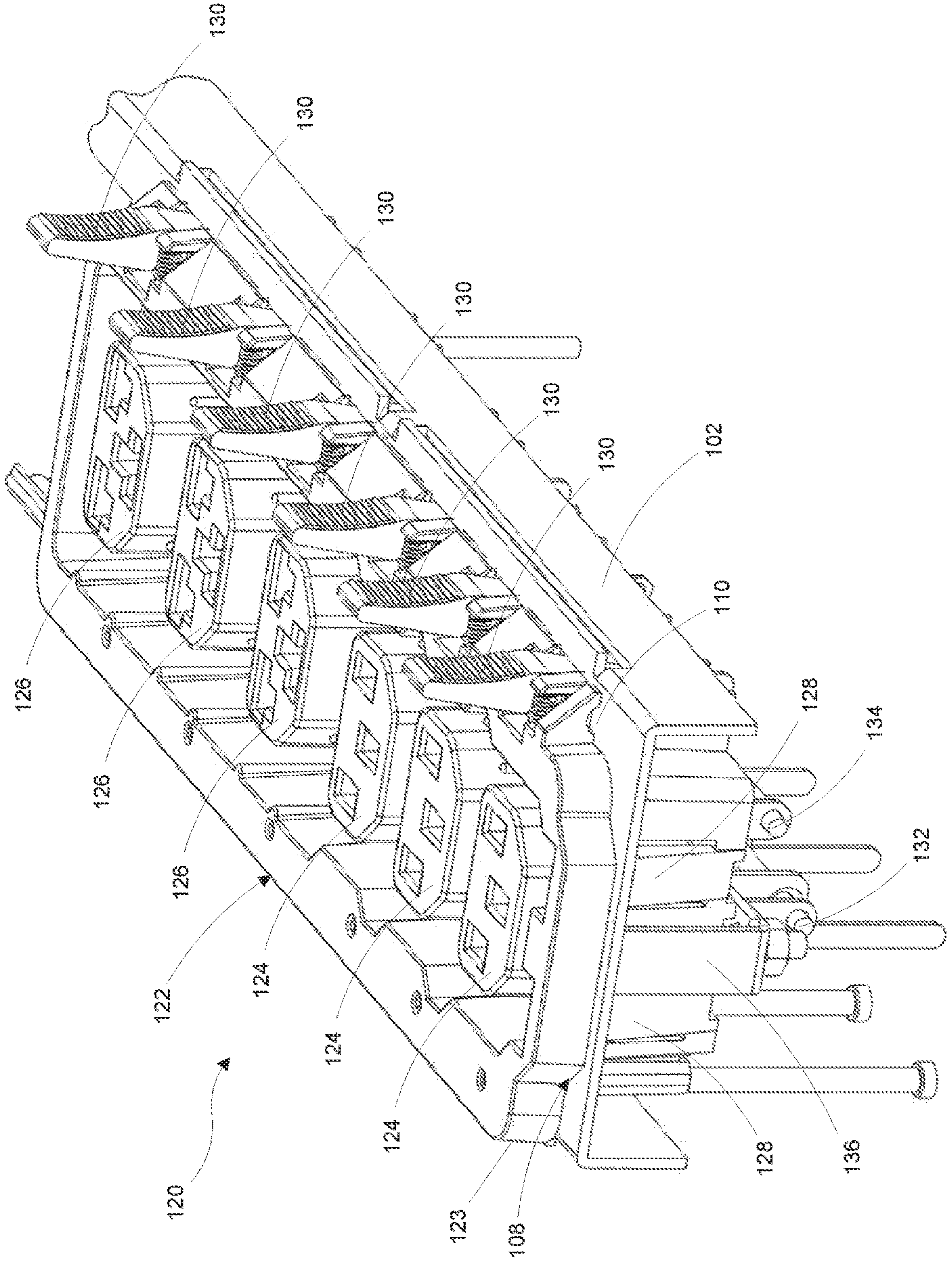
FIG. 2 is a partial isometric view of a locking combination outlet module according to a representative embodiment positioned in a PDU housing.

As show in FIG. 2, each locking combination outlet module 120 can include a module housing 122 and multiple outlets 124 and 126 positioned in the housing 122. The outlet module 120 may be inserted into a corresponding PDU housing opening 108 and retained therein by multiple retainers 128. In some embodiments, there are two retainers 128 on each end of the housing 122. The housing 122 can include a flange portion 123 extending at least partially around the perimeter of the housing 122 and positioned against the front face 110 of the PDU housing 102.

In some embodiments, the module can include various combinations of C13, C19, combination outlets and/or other suitable outlet types. The modules can include any suitable number of outlets arranged in any suitable orientation, pattern, and/or array. For example, outlet module 120 can include three C13 outlets 124 and three combination outlets 126, as shown. Combination outlets 126 are described more fully below with respect to FIGS. 6A and 6B. A latch lever 130 is pivotably coupled to the housing 122 adjacent each one of the outlets 124 and 126. Each latch lever 130 is moveable (e.g., pivotable) between a latch position (e.g., first position) (as shown in FIG. 2) whereby a mating plug (not shown) can be inserted into the module 120 and subsequently retained therein, and an unlatch position (e.g., second position) whereby the mating plug can be removed from the module 120.

Figure 3:
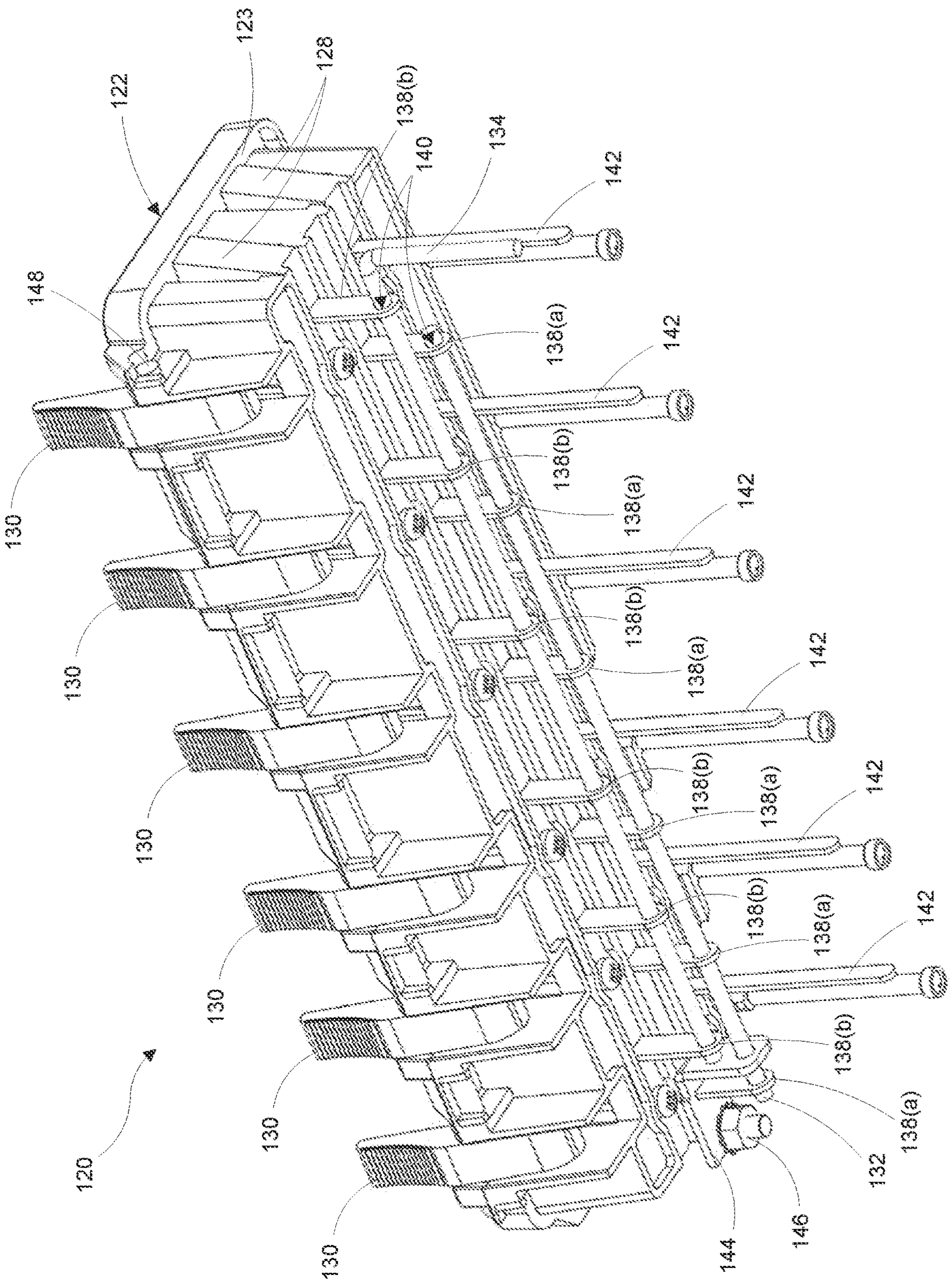
FIG. 3 is an isometric view of the outlet module shown in FIG. 2, as viewed from the lever side.

In some embodiments, the outlets 124 and 126 can be electrically ganged together via circuit conductors 132 and 134, for example. The PDU housing 102 can include a conductive ground tab 136 positioned to tie the ground circuit conductor 132 to chassis ground. Referring to FIG. 3, the outlets can each include a ground terminal 138 (*a*) ganged together via the ground circuit conductor 132. The ground circuit conductor 132 may in turn be coupled to the ground tab 136 (FIG. 2) with an angle bracket 144 and cooperating fasteners 146 (e.g., a nut and bolt). The outlets can each include a first power terminal 138 (*b*) ganged together via power circuit conductor 134. In some embodiments, the ground terminals 138 (*a*) and the first power terminals 138 (*b*) can have a common construction including a connection aperture 140 through which the circuit conductors 132 and 134 extend. Each outlet can also include a second power terminal 142. In some embodiments, only some of the terminals are electrically ganged together and in other embodiments all of the terminals may be left unganged.

The power circuit conductor 134 and each second power terminal 142 can be coupled to a controller (not shown) to individually control and monitor each outlet. The terminals 138 can be soldered to the conductors 132/134, for example. In some embodiments, the conductors 132/134 and the electrical terminals 138 and 142 can be constructed from suitable electrically conductive materials such as tin, gold, silver, copper, phosphor bronze, and the like. Multiple materials can be used in combination. In one embodiment, the terminals can comprise copper alloy with a tin plating. Ganged outlet connection schemas are also described in commonly owned U.S. patent application Ser. No. 16/039,211, filed Jul. 18, 2018, the disclosure of which is hereby incorporated by reference in its entirety.

As shown in FIG. 3, each of the latch levers 130 can pivot about a common pivot shaft 148. Thus, each latch lever 130 can be moved between a first position, wherein the latch lever 130 is capable of engaging a mating plug (not shown) and a second position, wherein the latch lever 130 is disengaged from the plug. In some embodiments, the pivot shaft 148 can be captured in the module housing 122 by the PDU housing 102, as the pivot shaft 148 is aligned with the front face 110 (see FIG. 2). In some embodiments, each latch lever 130 can have its own separate pivot shaft or pin.

Figure 4:
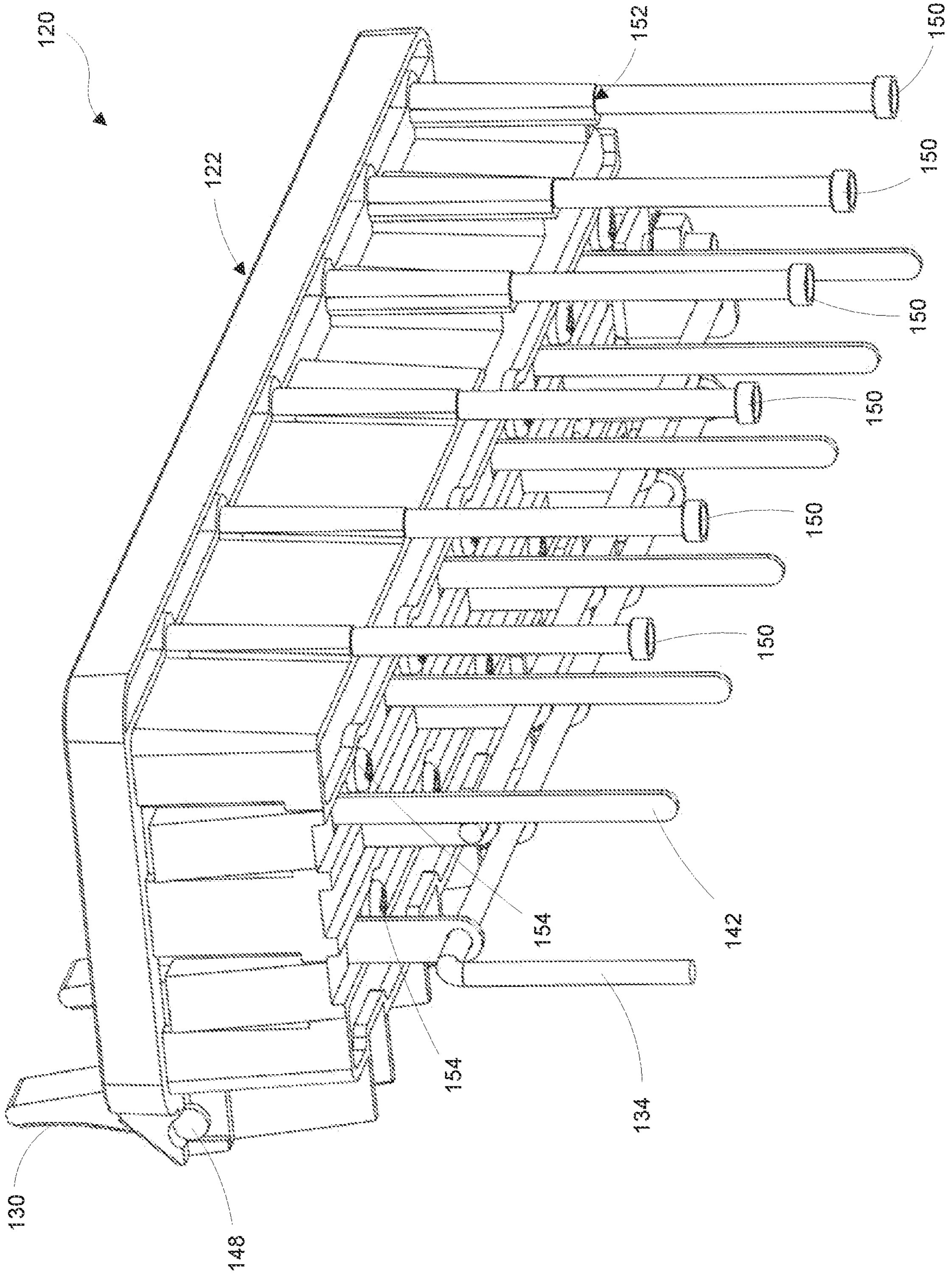
FIG. 4 is an isometric view of the outlet module shown in FIGS. 2 and 3, as viewed from the bottom and opposite the levers.
Figure 5:
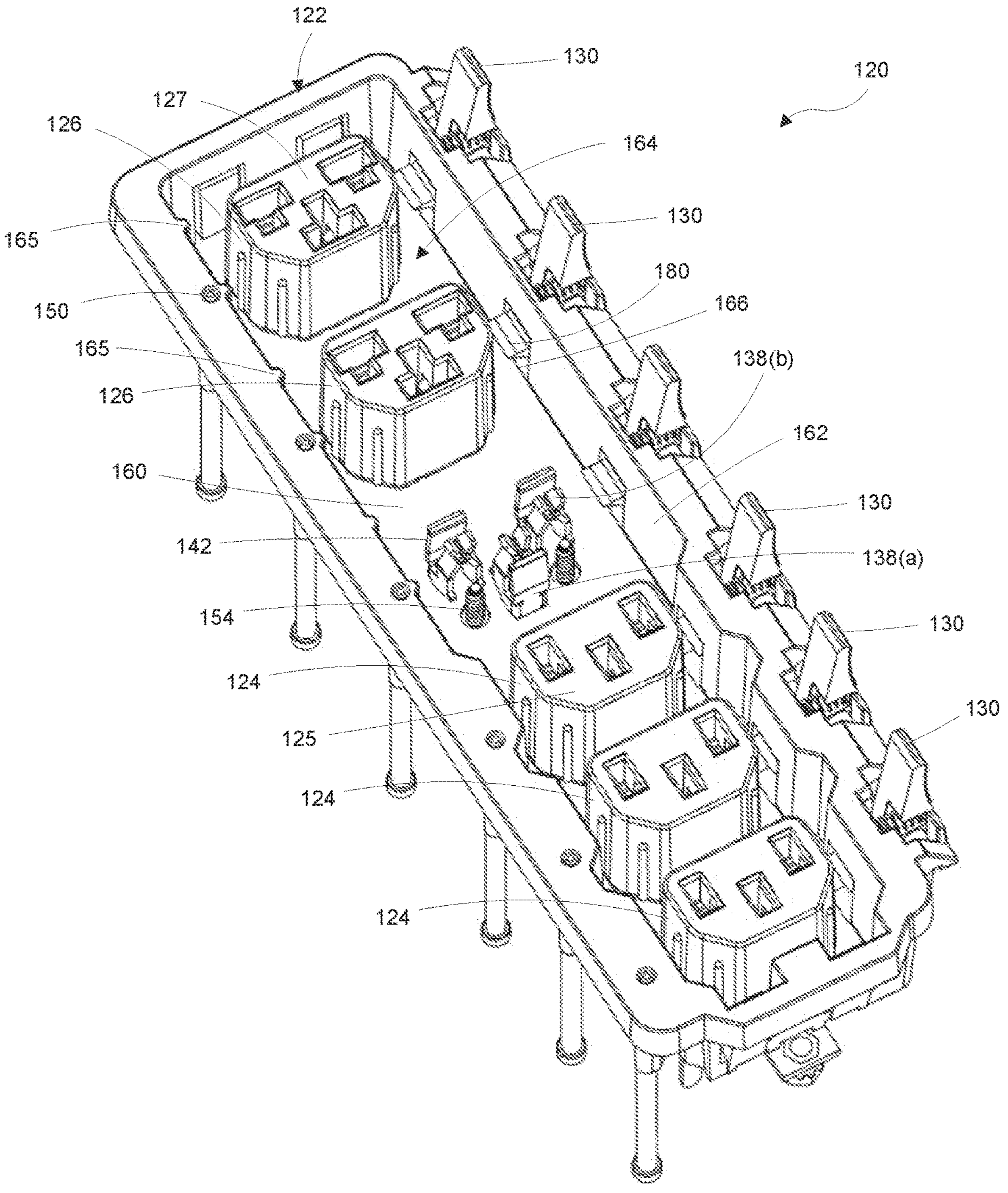
FIG. 5 is a partial isometric view of the outlet module shown in FIGS. 2-4, as viewed from the top.

Turning to FIG. 4, in some embodiments, the outlet module 120 can include light pipes 150 extending from a printed circuit board (not shown) and into a corresponding opening 152 in the module housing 122. The light pipes 150 can comprise a light conducting plastic material to transfer light from a light emitting diode (not shown) on the printed circuit board to the top of the module adjacent each outlet (FIG. 5). This arrangement can be used to indicate the status of the outlets (e.g., on or off).

In some embodiments, suitable fasteners, such as screws 154, can extend through the bottom of the module housing 122 to secure the outlets 124 and 126 to the outlet module 120. Referring to FIG. 5, each outlet 124 and 126 can comprise a separate outlet core 125 and 127, respectively, fastened to a base surface 160 of the module housing 122. Each outlet 124/126 also includes terminals 138 and 142 as shown. One of the outlet cores 127 is removed to illustrate the positions of the terminals 138 and 142 therein. An outlet core is understood to be as described in commonly owned U.S. Pat. Nos. 9,614,335 and 9,627,828, filed Apr. 9, 2015 and Nov. 13, 2014, respectively, the disclosures of which are incorporated herein by reference in their entireties.

In some embodiments, the module housing 122 includes the base surface 160 and a sidewall 162 extending therefrom to at least partially surround an interior region 164. The base surface 160 and the sidewall 162 can comprise an integrally molded unitary body (e.g., injection molded plastic). In some embodiments, the outlet cores 125 and 127 can also be integrally molded with the base surface 160 and the sidewall 162.

Each latch lever 130 is pivotably coupled to the sidewall 162 outside the interior region 164, wherein each latch lever 130 is positioned adjacent a corresponding one of the outlet cores 125/127. Each latch lever 130 includes a tooth portion 180 extending through a corresponding aperture 166 and into the interior region 164 to engage a mating plug (not shown) when the latch lever 130 is in the latch position as shown in FIG. 5. In some embodiments, the sidewall 162 can include ribs 165 positioned opposite the latch levers 130 to account for variability in the dimensions of a mating plug to help ensure that the latch lever tooth 180 remains engaged with the plug.

Figure 6A:
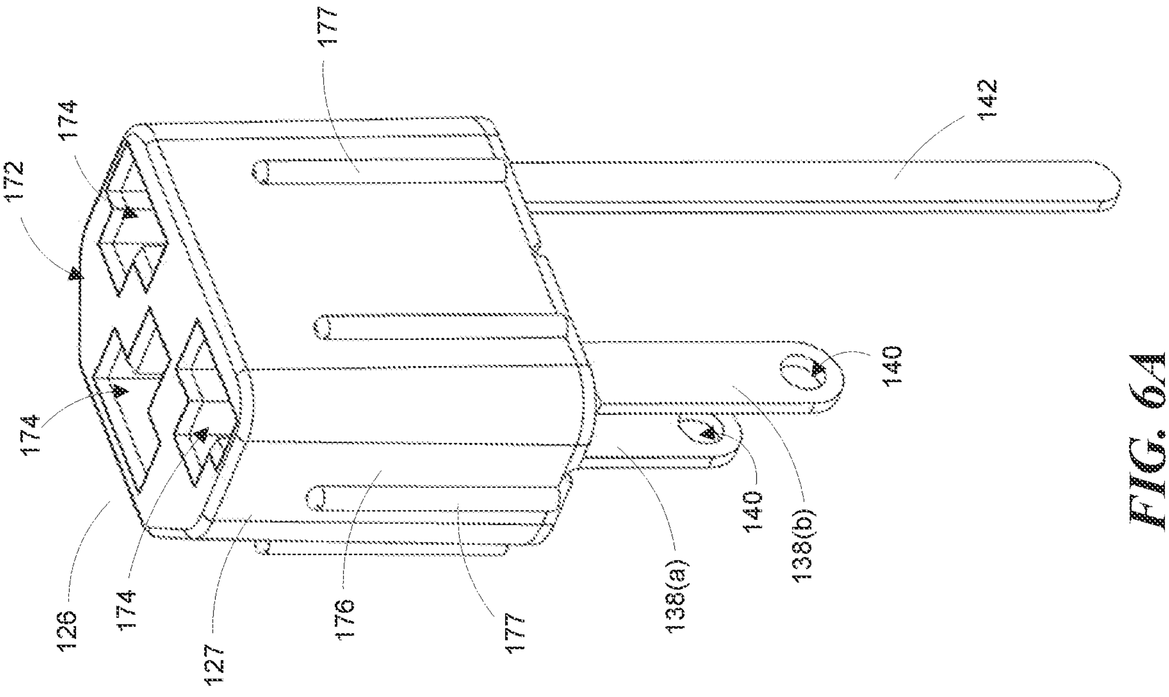
FIG. 6A is an isometric view of a combination outlet core according to a representative embodiment, as viewed from the top.
Figure 6B:
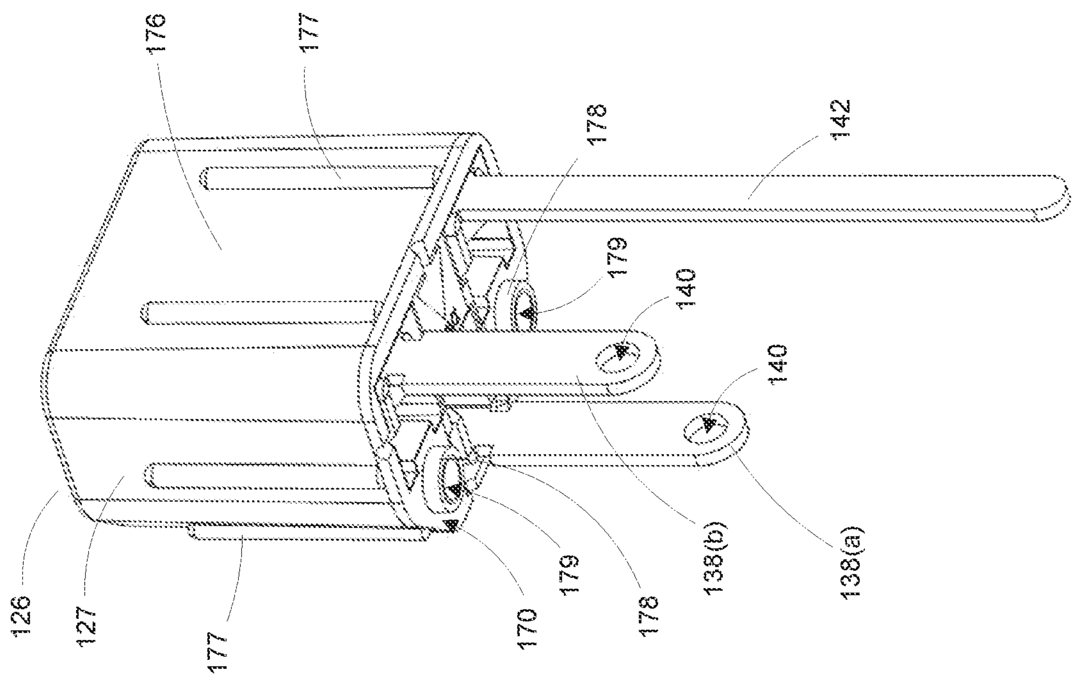
FIG. 6B is an isometric view of the combination outlet core shown in FIG. 6A as viewed from the bottom.

As shown in FIGS. 6A and 6B, the combination outlet 126 incorporates slots 174 and electrical contacts 138/142 for a first connector type (e.g., standard C13/C14) as well as a second connector type (e.g., standard C19/C20). In other words, the outlet core 127 has the envelope of a C13 outlet, but can accept both C14 and C20 plugs. The standard connector types referred to herein (e.g., C13, C14, C19, and C20) all refer to industry standard connectors defined in International Electro technical Commission (IEC) standard publication IEC60320 as of the filing date of the present application.

Although the embodiments are shown and described with respect to C13/C14 and C19/C20 connectors, other connector combinations could be used. Other suitable connector types might include, for example and without limitation, industry standard connectors, such as IEC C2, C4, C6, C8, C10, C12, C16, C16A, C18, C22, C24 or NEMA 5-10R, 5-15R, 5-20R, 6-20R, 6-30R, 6-50R, L15-20R, L15-30R, L21-20R, L21-30R. In various embodiments, the connectors could include connectors defined in the IEC standard as of the filing date of the present application.

The combination outlet core 127 has an input side 170 and an output side 172 with three apertures 174 extending therebetween. The outlet core 127 has a core outer surface 176 configured to mate with a first connector type. For example, in the depicted embodiment the core outer surface 176 is configured as a C13 outlet to mate with a C14 plug. The apertures 174 are each configured to receive mating terminals corresponding to both the first connector type (e.g., C14) and the second connector type (e.g., C20). In this embodiment, the apertures 174 comprise intersecting crosswise slots or T-shaped apertures, for example. Accordingly, the apertures 174 can accept the terminals of a C20 plug and the perpendicularly oriented terminals of a C14 plug. In some embodiments, the combination outlet core 127 can comprise injection molded plastic, for example.

The input side 170 of the combination outlet core 127 can include a pair of bosses 178 and corresponding mounting holes 179. The bosses 178 can be used to locate the combination outlet core 127 on the base surface 160 (FIG. 5). Screws 154 (FIG. 5) can be threaded into the mounting holes 179 in order to attach the outlet core 127 to the base surface 160. Other mounting arrangements are possible. For example, the outlet core 127 can be adhered to the base surface 160 with a suitable adhesive. In still other embodiments, the outlet core 127 can be captured on the base surface 160 by the electrical terminals 138/142. In some embodiments, the core outer surface 176 can include a plurality of ribs 177 to help retain a mating plug on the outlet 126. The ribs 177 can help account for variability in the dimensions of mating plugs and reduce side-to-side movement between a core and mating plug, which helps ensure that the latch lever tooth 180 remains engaged with the mating plug. Combination outlets are also described in commonly owned U.S. Pat. No. 10,249,998, filed Jul. 13, 2017, and U.S. Pat. No. 10,498,096, filed Apr. 1, 2019, the disclosures of which are hereby incorporated by reference in their entireties. In some embodiments, the C13 outlet 124 can have essentially the same construction as that described above with respect to the combination outlet 126, with the exception that the C13 outlet core 125 does not have T-shaped apertures (see e.g., FIG. 5).

Figure 7:
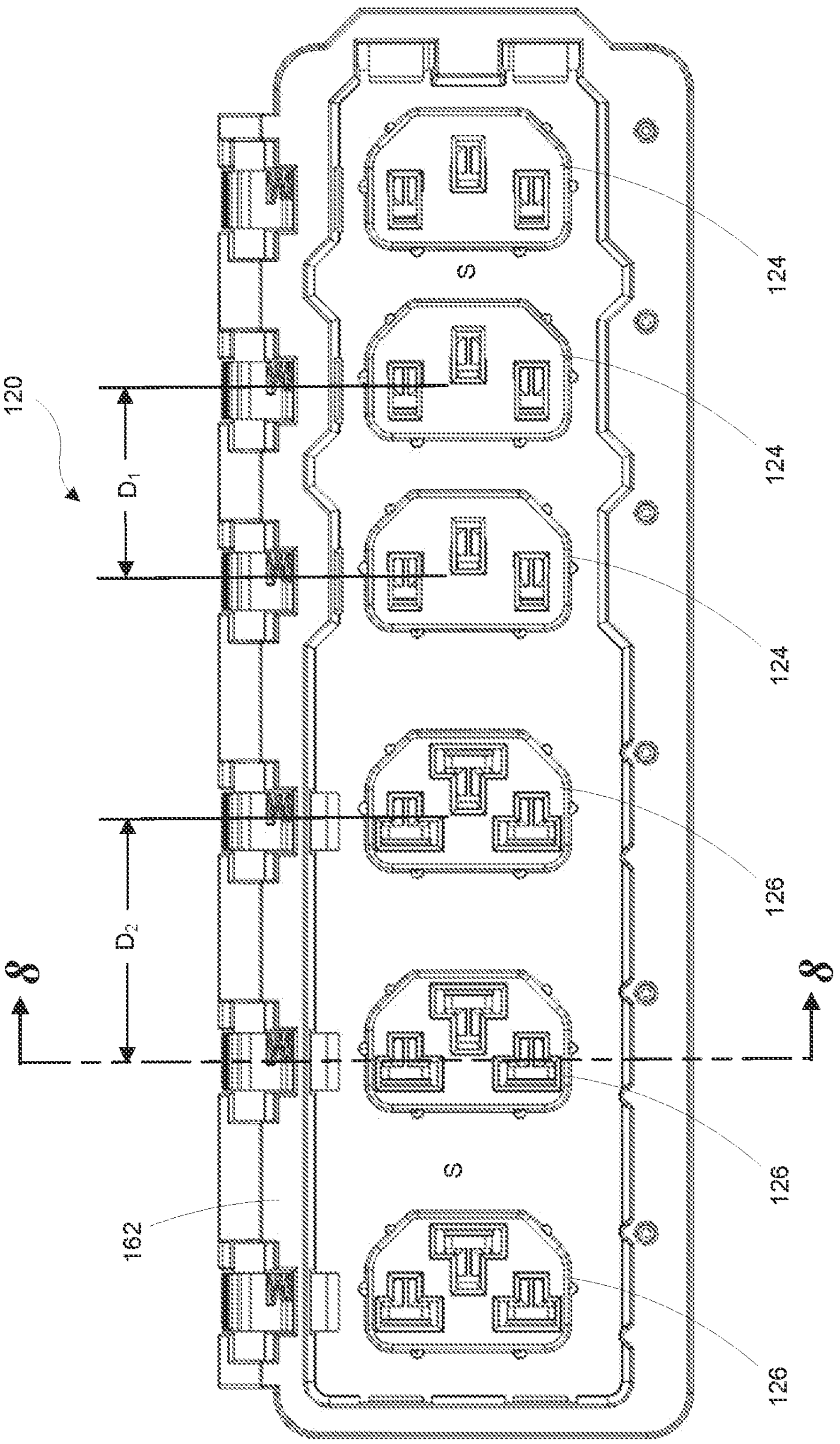
FIG. 7 is a top plan view of the outlet module shown in FIGS. 2-5.

As shown in FIG. 7, the C13 outlets 124 can be spaced apart from each other a first distance $D_1$ and the combination outlets 126 can be spaced apart a second distance $D_2$. The combination outlets 126 can also have more clearance between the sidewall 162 and the outlets than the C13 outlets 124 in order to accommodate a C20 plug, which is larger than a C14 plug. In some embodiments, $D_1$ is approximately 21.10 mm and $D_2$ is approximately 26.55 mm. The outlets 124 and 126 have an unobstructed space S between adjacent outlet cores, which is in contrast to conventional outlet arrangements. Conventional arrangements have a wall extending between each outlet. The present technology does not have a wall between adjacent outlets thereby allowing the outlets to be spaced closer together than they could be with a wall between them. High density outlet designs are further described in commonly owned U.S. Pat. Nos. 9,614,335 and 9,627,828, previously incorporated herein by reference.

Figure 8:
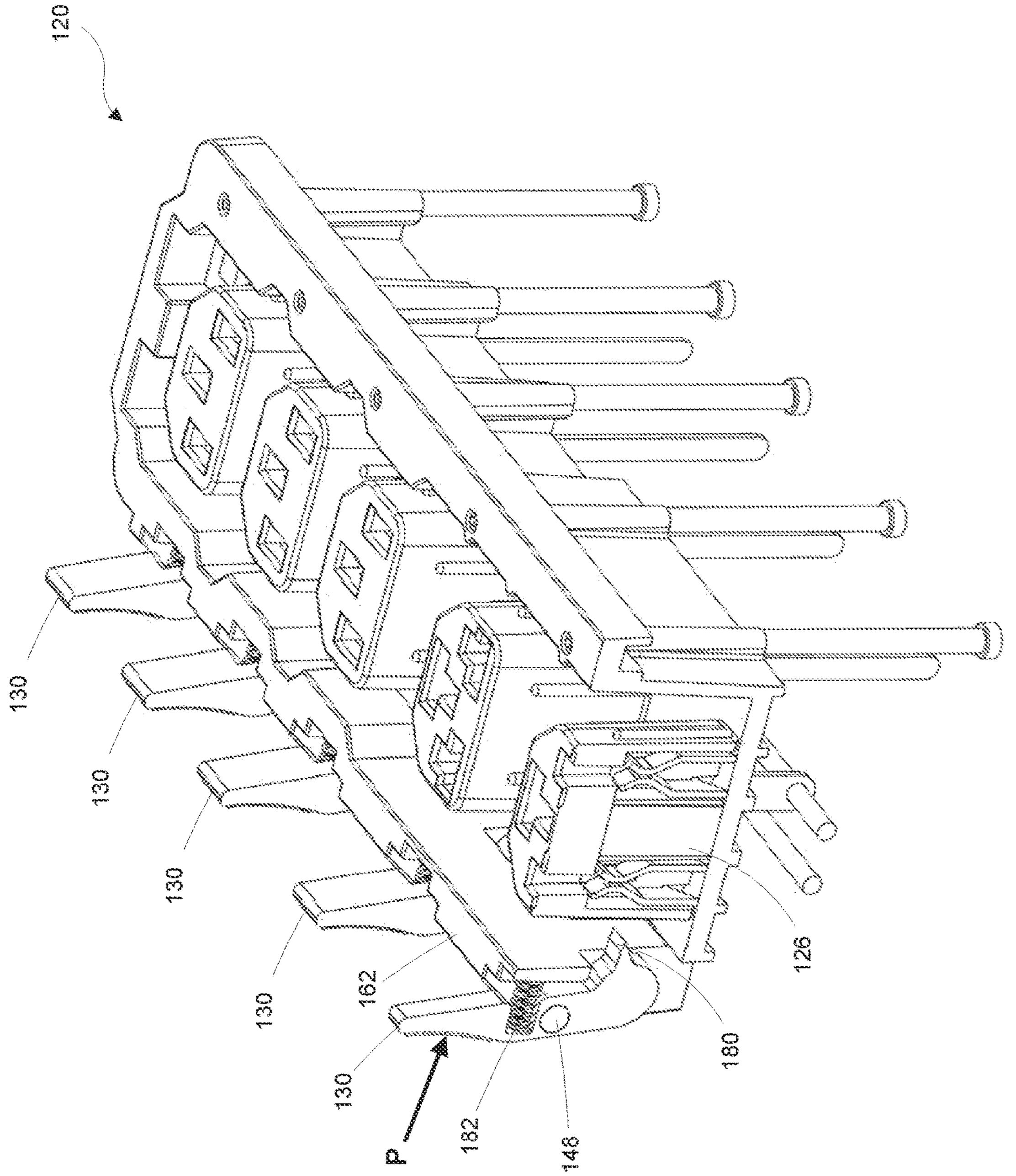
FIG. 8 is a cross-sectional isometric view of the outlet module taken about line 8-8 in FIG. 7.

As shown in FIG. 8, the outlet module 120 can include multiple resilient members, such as coil compression spring 182, each positioned between the sidewall 162 and a corresponding one of the multiple latch levers 130. Although a compression spring is described herein, other suitable resilient member arrangements can be used, such as coil tension springs, torsion springs, and rubber members, to name a few. The compression spring 182 is positioned with respect to the pivot shaft 148 to bias the corresponding latch lever tooth portion 180 toward the latch position (as shown in FIG. 8). To temporarily move the latch lever 130 to an unlatch position, a user can push and hold the latch lever 130 toward, for example, the outlet 126, as indicated by arrow P, thereby pivoting the tooth portion 180 away from the outlet 126, such that the tooth portion 180 is retracted from a mating plug (not shown).

Figure 9:
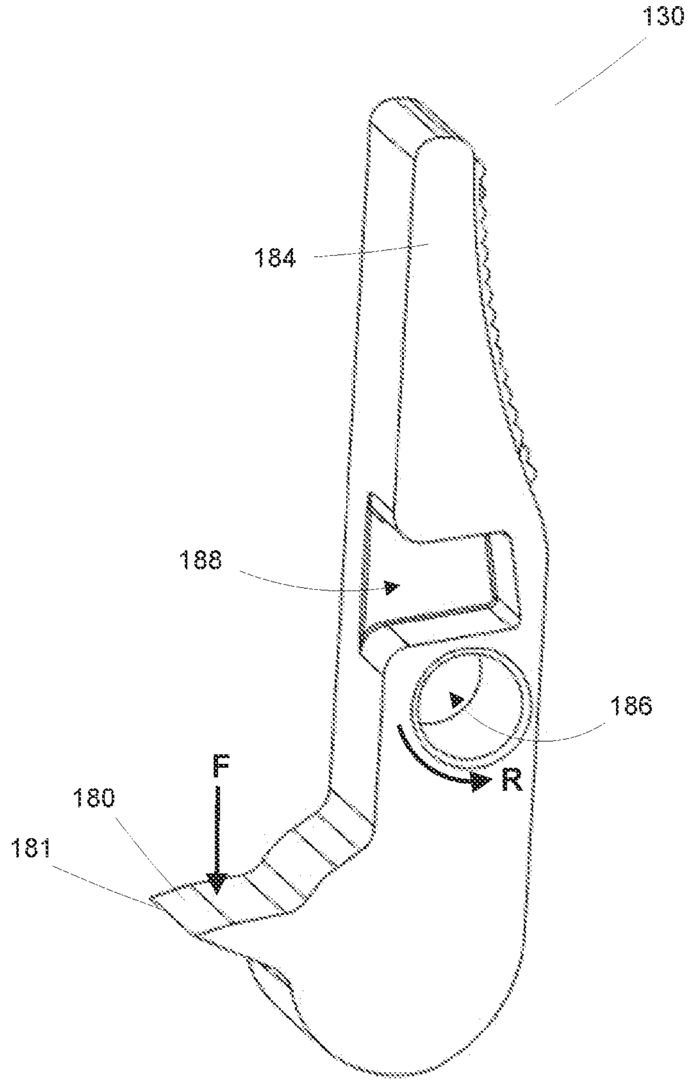
FIG. 9 is an isometric view of a representative latch lever as shown in FIGS. 7 and 8.

As shown in FIG. 9, the latch levers 130 can each comprise a release tab 184 located opposite the tooth portion 180. A pivot bore 186 is positioned between the release tab 184 and the tooth portion 180. A spring pocket 188, is positioned between the release tab 184 and the pivot bore 186, whereby the compression spring 182 (FIG. 8) normally biases the tooth portion 180 toward a corresponding outlet. In some embodiments, the spring pocket 188 has an open side, as shown, to facilitate assembly, whereas in other embodiments, the spring pocket 188 can have closed sides. When a plug is inserted into the interior region 164 (FIG. 5) and onto an outlet, the plug exerts a force F on the tooth portion 180 which in turn pivots the latch lever 130 as indicated by arrow R to allow the plug to move past the tooth portion 180. Once the plug is fully inserted, the tooth portion 180 is urged by the spring 182 to engage a surface on the side of the plug, for example, thereby locking the plug in the outlet module 120. In some embodiments, the tooth portion 180 has a sharp edge 181 configured to bite into the side of a plastic plug. In some embodiments the tooth portion 180 can engage an opening or recess (not shown) on the side of the plug.

Figure 10:
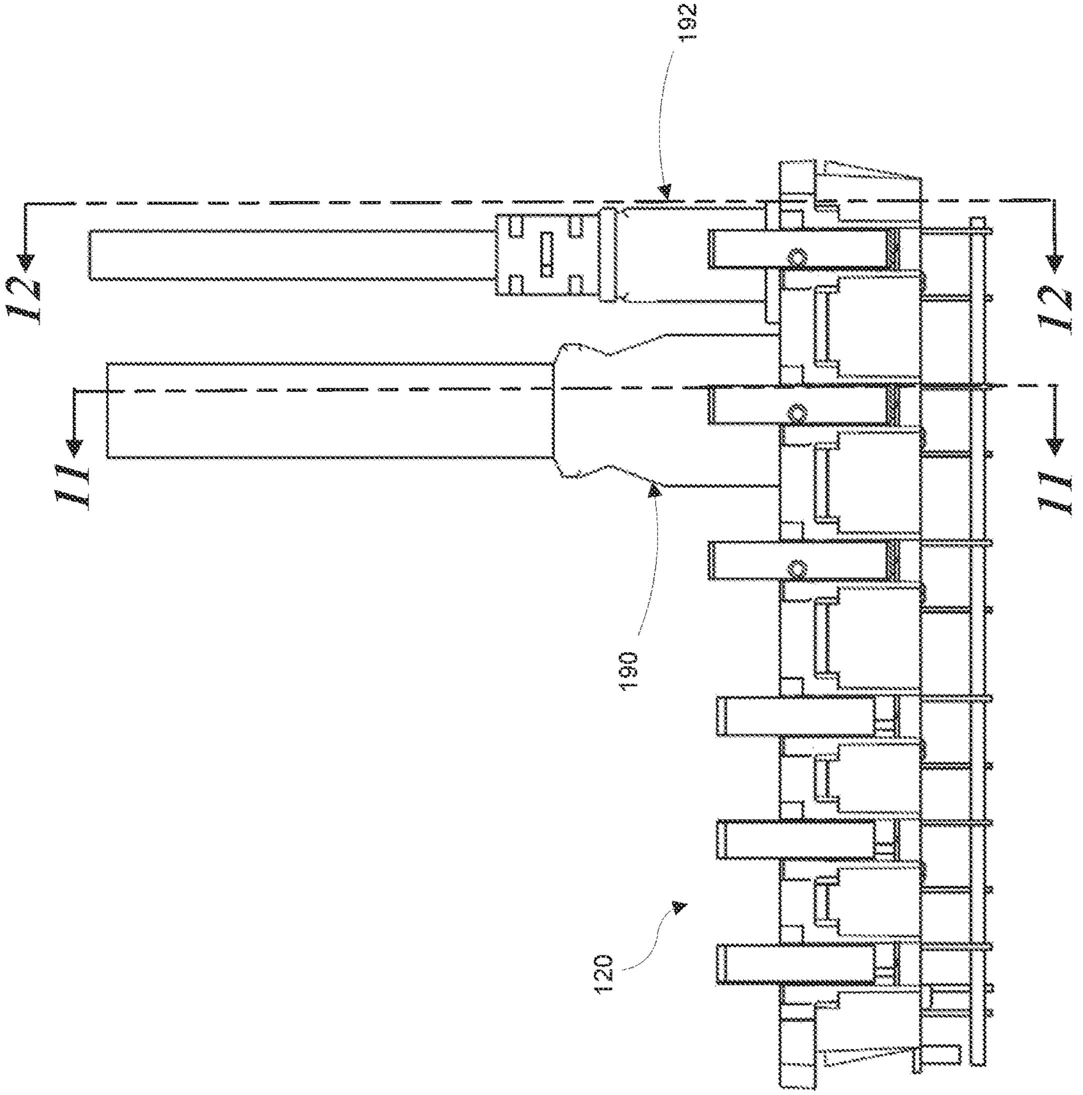
FIG. 10 is a side view of a locking combination outlet module with representative power cords connected thereto.
Figure 11:
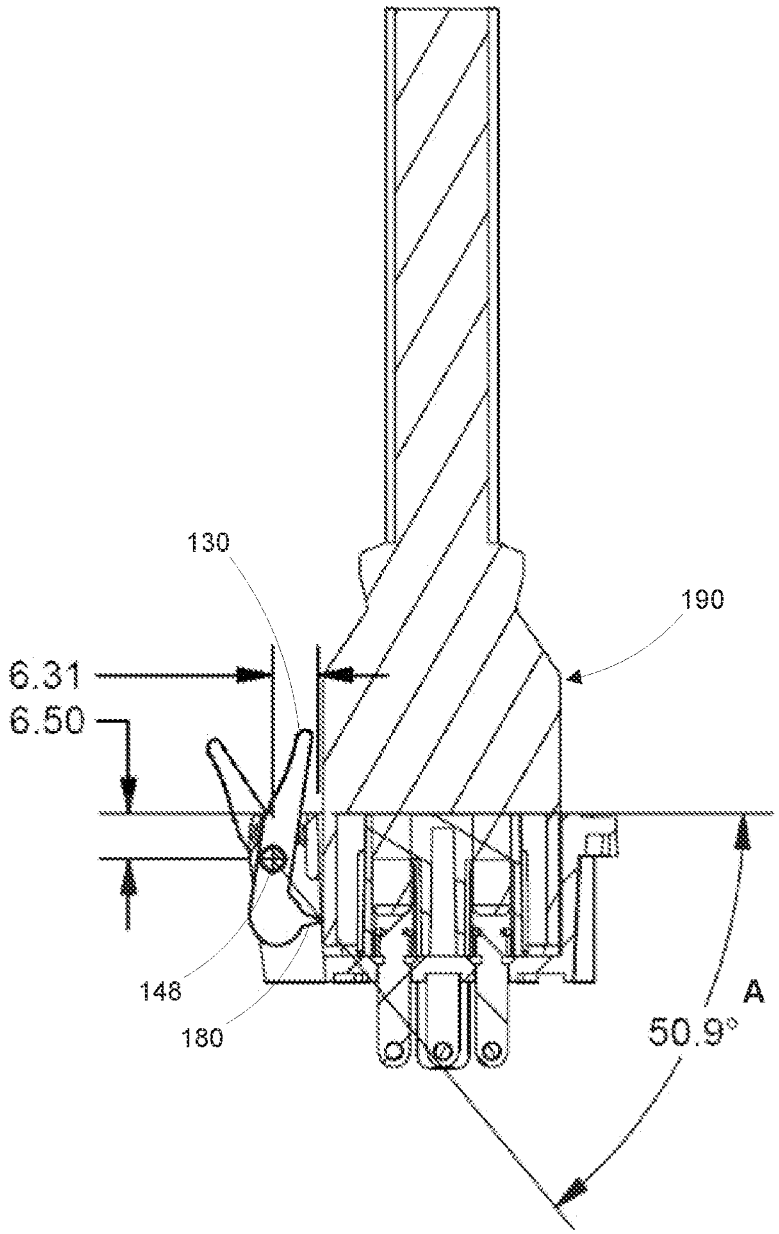
FIG. 11 is a cross-sectional view of the outlet module and cords taken about line 11-11 in FIG. 10.
Figure 12:
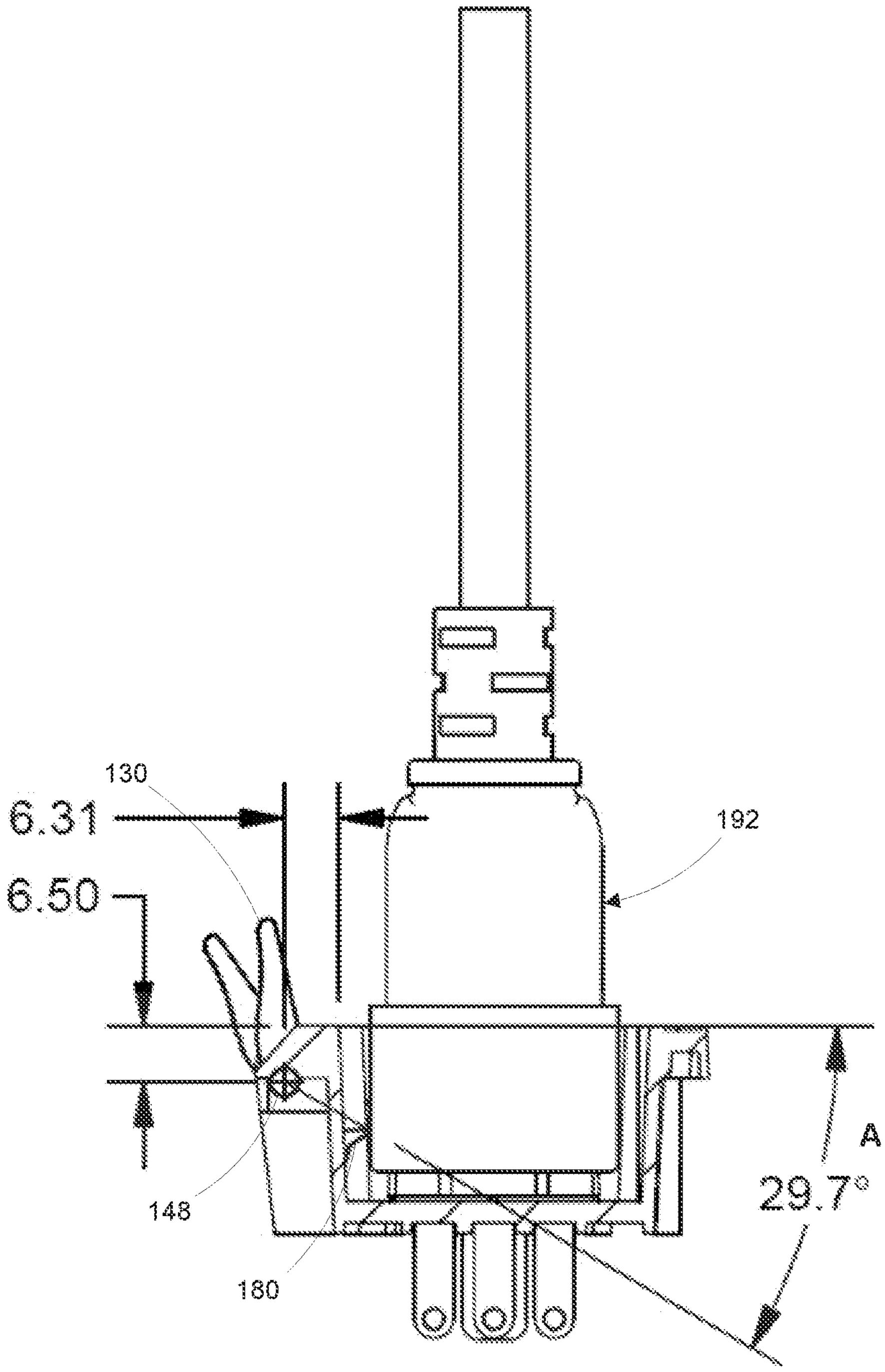
FIG. 12 is a cross-sectional view of the outlet module and cords taken about line 12-12 in FIG. 10.

FIG. 10 illustrates a locking combination outlet module 120 with representative power cords connected thereto. One of the power cords includes an IEC C20 plug 190 and the other cord includes an IEC C14 plug 192. As shown in FIGS. 11 and 12, the latch levers 130 are arranged in the outlet module to retain both types of plugs (e.g., C14 and C20). In a representative embodiment as shown in FIG. 11, the center of pivot shaft 148 is positioned such that the tooth 180 can engage both types of plugs. In some embodiments, the center of the pivot shaft 148 can be located approximately 6.5 mm from the top of the module and approximately 6.3 mm from an inside surface of the module. Thus, when a C20 plug 190 is inserted into the module, the angle A between the top surface of the module and a line extending through the center of shaft 148 and the edge of tooth 180 is approximately 50.9 degrees. Referring to FIG. 12, when a C14 plug 192 is inserted into the module, the angle A between the top surface of the module and the line extending through the center of shaft 148 and the edge of tooth 180 is approximately 29.7 degrees.

Figure 13:
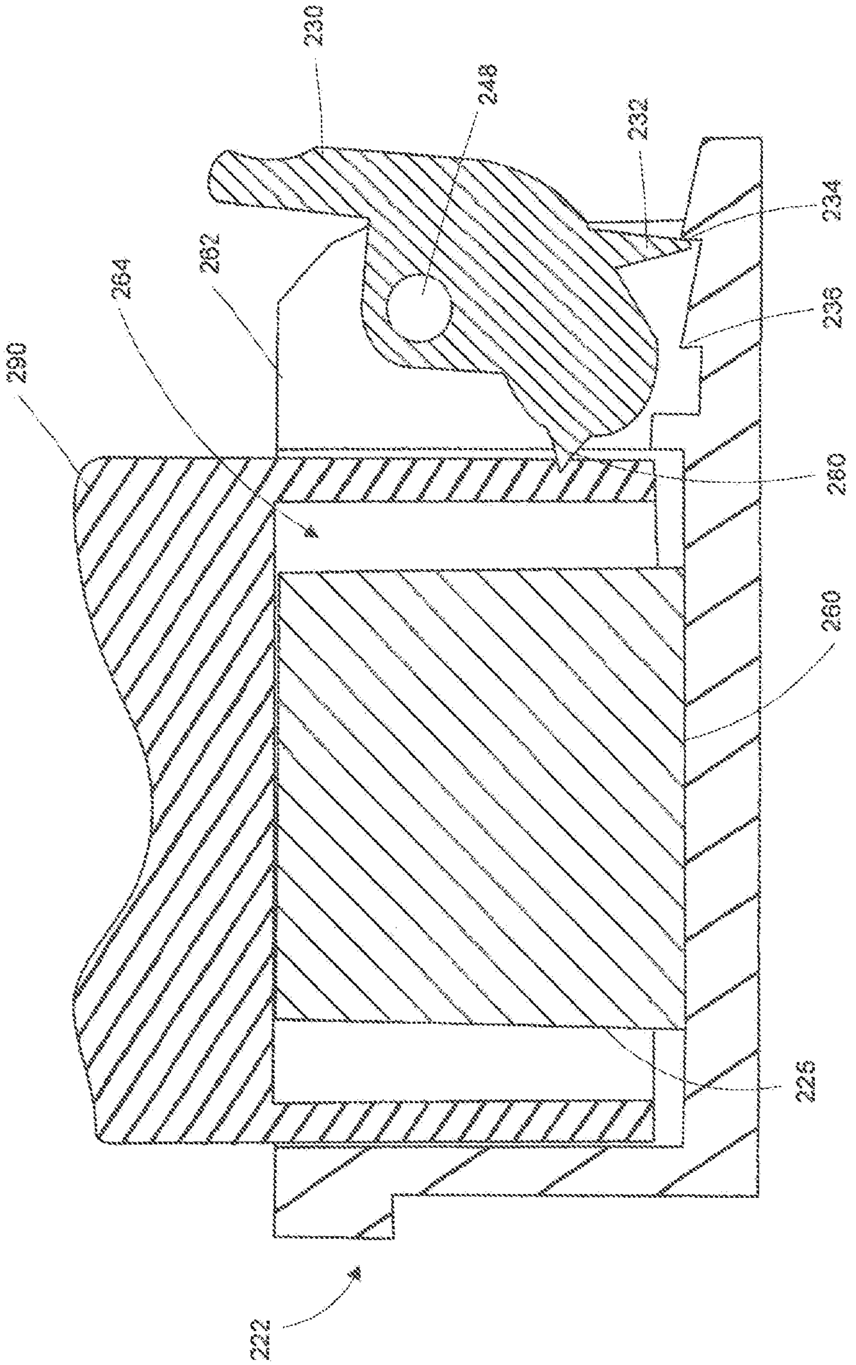
FIG. 13 is a cross-sectional view of a latch lever arrangement according to another representative embodiment.

FIG. 13 is a cross-sectional diagram of a latch lever arrangement according to another representative embodiment. In the depicted embodiment, the module housing 222 includes a base surface 260 and a sidewall 262 extending therefrom to at least partially surround an interior region 264. The base surface 260 and the sidewall 262 can comprise an integrally molded unitary body (e.g., injection molded plastic). In some embodiments, an outlet core 225 can also be integrally molded with the base surface 260 and the sidewall 262. In other embodiments, the outlet core 225 is a separate element suitably attached to the base surface 260.

Each latch lever 230 is pivotably coupled to the sidewall 262 with a pivot shaft 248 outside the interior region 264, wherein each latch lever 230 is positioned adjacent a corresponding outlet core 225. Each latch lever 230 includes a tooth portion 280 extending into the interior region 264 to engage a mating plug, such as IEC C20 plug 290, when the latch lever 230 is in a latch position as shown. The latch lever 230 includes a pawl 232 positioned to engage one of multiple latch positions each corresponding to a ratchet tooth. In this case, there are two ratchet teeth 234 and 236 formed in the housing 222. Tooth 234 corresponds to a first latch position for engaging a C20 plug and tooth 236 corresponds to a second latch position for engaging a C14 plug. In some embodiments, the pawl 232 can comprise a resilient material, such as plastic, in order to allow the pawl 232 to deform as it moves over each tooth.

Figure 14:
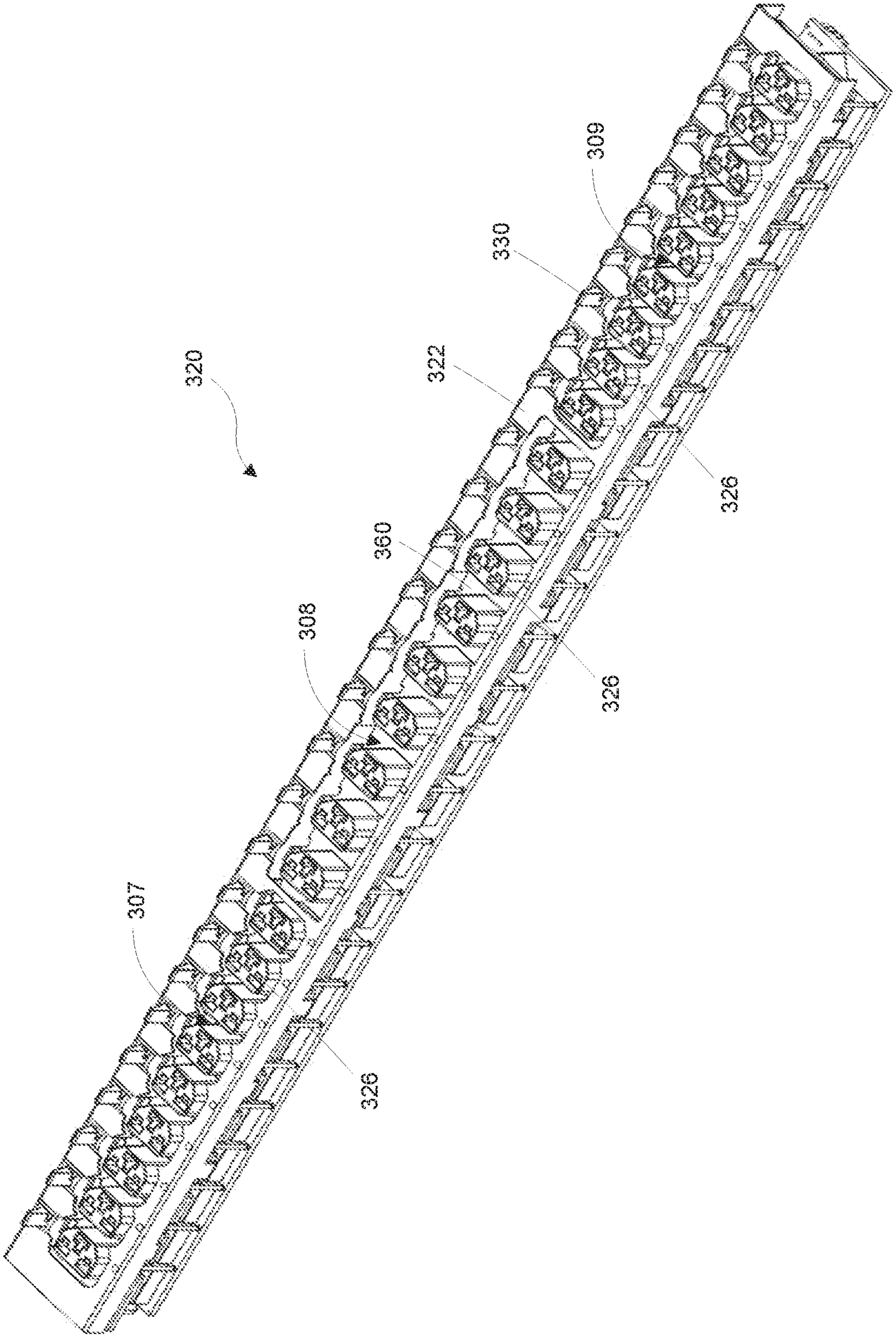
FIG. 14 is an isometric view of a locking combination outlet module according to another representative embodiment.

FIG. 14 illustrates a locking combination outlet module 320 according to another representative embodiment. The locking combination outlet module 320 can include a front panel 322 which can comprise part of a PDU housing in which the module 320 is housed. In some embodiments, the module can include various combinations of C13, C19, combination outlets and/or other suitable outlet types. The module can include any suitable number of outlets arranged in any suitable orientation, pattern, and/or array. As shown in the depicted embodiment, outlet module 320 can include 27 combination outlets 326. The combination outlets 326 are substantially the same as combination outlets 126 and are thus described more fully above with respect to FIGS. 6A and 6B.

The outlets 326 can be spaced apart to accommodate different plug types. For example, the first and third sets of nine outlets 326 are spaced apart to accommodate C14 plugs while the second (i.e., center) set of outlets are spaced further apart to accommodate both C14 and C20 plugs. See FIG. 7 for suitable outlet spacings, for example. In some embodiments, each set of outlets 326 is positioned in a corresponding opening 307-309 in the front panel 322.

Figure 15:
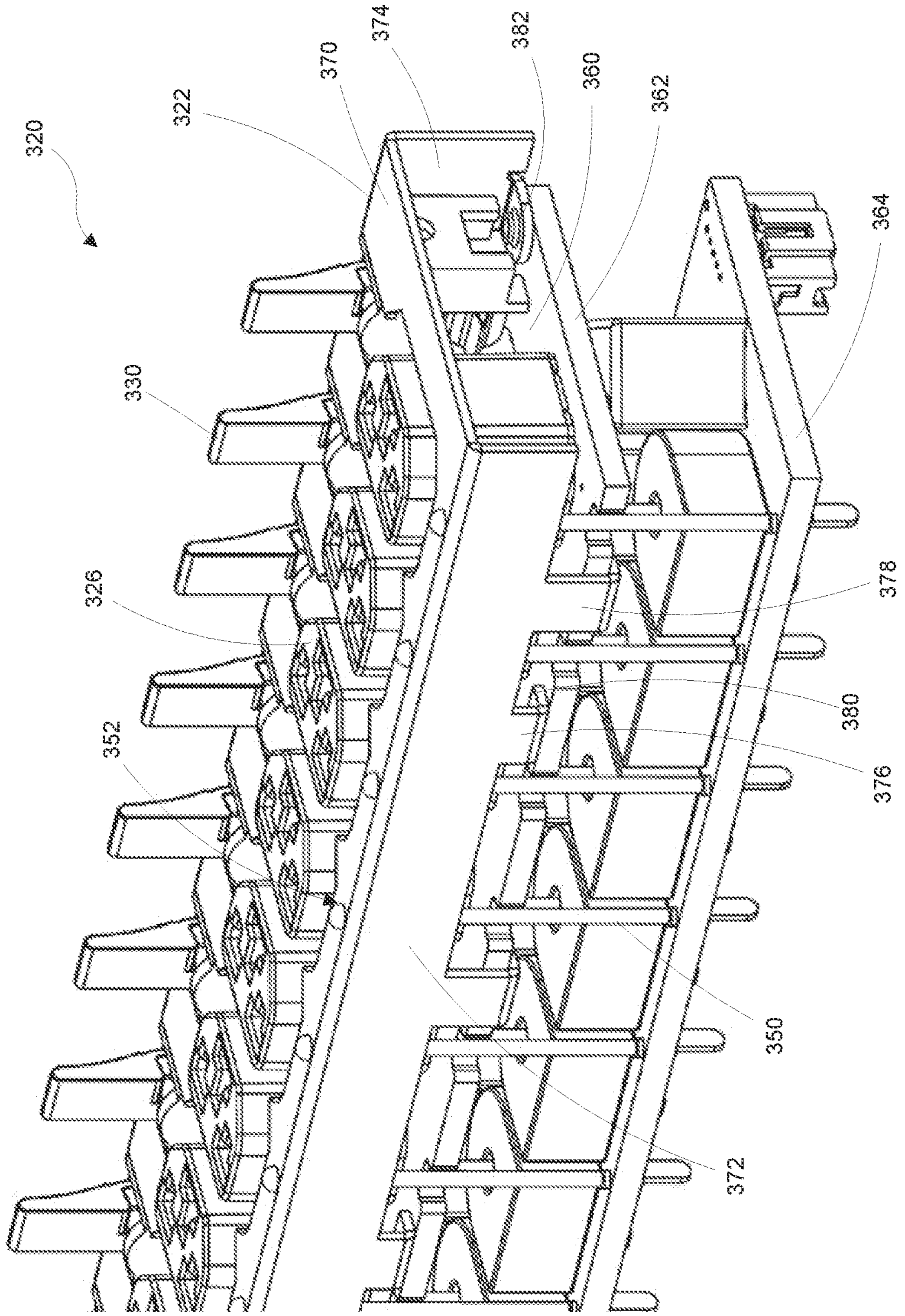
FIG. 15 is a partial isometric view of the locking combination outlet module shown in FIG. 14 as viewed from the top and opposite the levers.

In some embodiments, the module 320 includes a base surface 360 from which the outlet cores 326 extend. The base surface 360 can be the surface of a first printed circuit board (PCB), such as an outlet board 362 (FIG. 15). As with the foregoing embodiments described herein, the outlets 326 have an unobstructed space between adjacent outlet cores, as shown.

A latch lever 330 is positioned adjacent each one of the outlets 326. Each latch lever 330 is moveable (e.g., pivotable) between a latch position (e.g., first position) (as shown in FIG. 14) whereby a mating plug (e.g., plugs 190 and 192 in FIG. 10) can be inserted into the module 320 and subsequently retained therein, and an unlatch position (e.g., second position) whereby the mating plug can be removed from the module 320.

Referring to FIG. 15, in some embodiments, the outlet module 320 can include light pipes 350 extending from a second PCB, such as a relay board 364 and into a corresponding opening 352 in the front panel 322. The light pipes 350 can comprise a light conducting plastic material to transfer light from a light emitting diode (not shown) on the relay board 364 to the top of the module adjacent each outlet. This arrangement can be used to indicate the status of the outlets (e.g., on or off).

Each outlet core 326 can be mounted to the outlet board 362 in a similar manner to that described above with respect to FIG. 5. Accordingly, the outlet cores 326 can be mounted using suitable fasteners, such as screws 154 extending through the outlet board 362. Each outlet 326 also includes terminals similar to terminals 138 and 142, as shown and described with respect to FIG. 5.

The front panel 322 can include a face portion 370 with first and second side panel portions 372 and 374, respectively. The first side panel 372 can include multiple short and long fingers 376 and 378, respectively, positioned to support and capture a side of the outlet board 362. Each finger 376 and 378 can include a inwardly extending support tab 380 positioned to confront a corresponding top or bottom of the outlet board 362. The second side panel 374 can include multiple inwardly extending mounting tabs 382 having threaded inserts, for example, to receive an attachment screw (not visible) for securing the outlet board 362 to the front panel 322.

Figure 16:
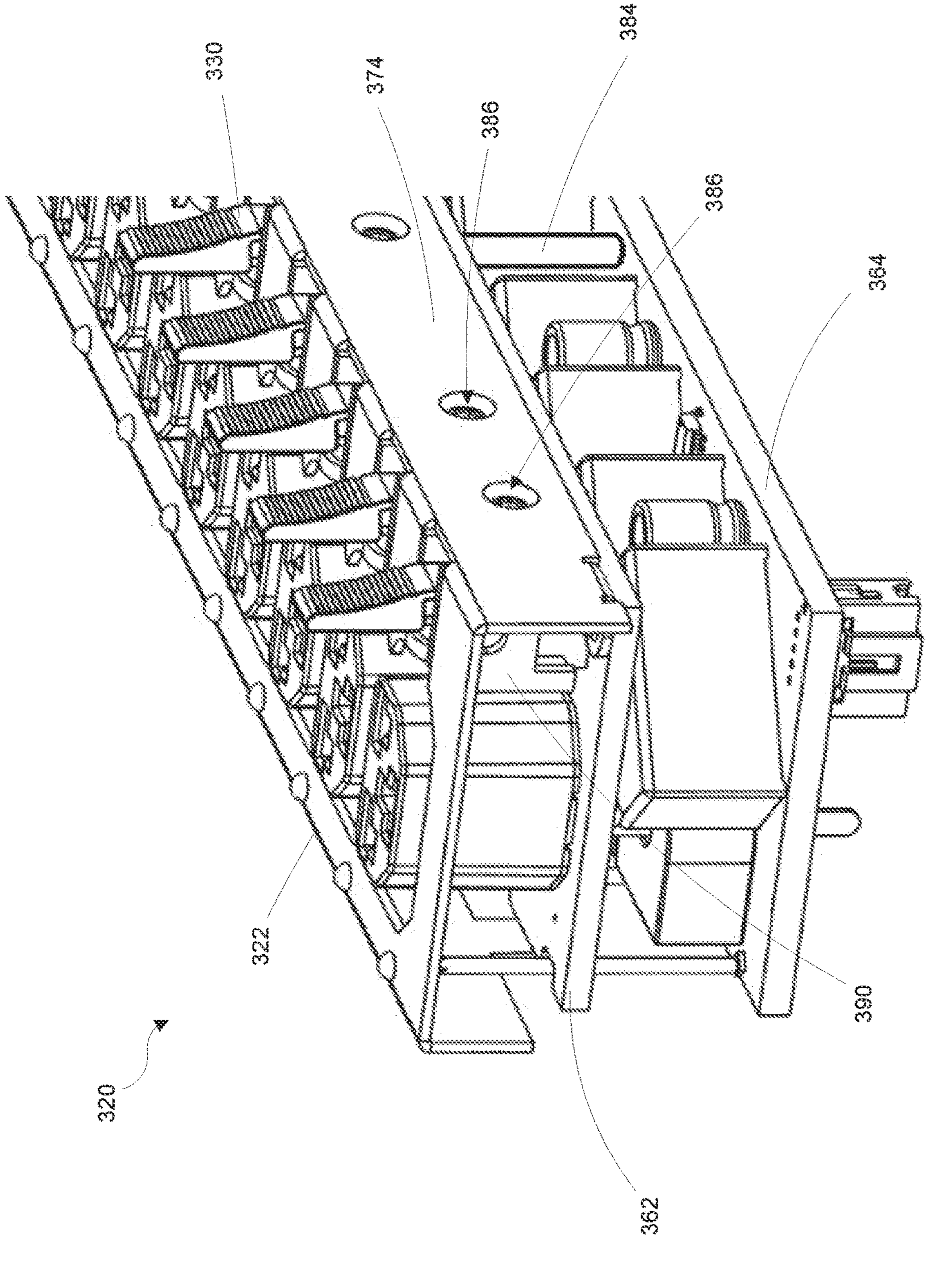
FIG. 16 is a partial isometric view of the locking combination outlet module shown in FIG. 14 as viewed from the lever side.
Figure 17:
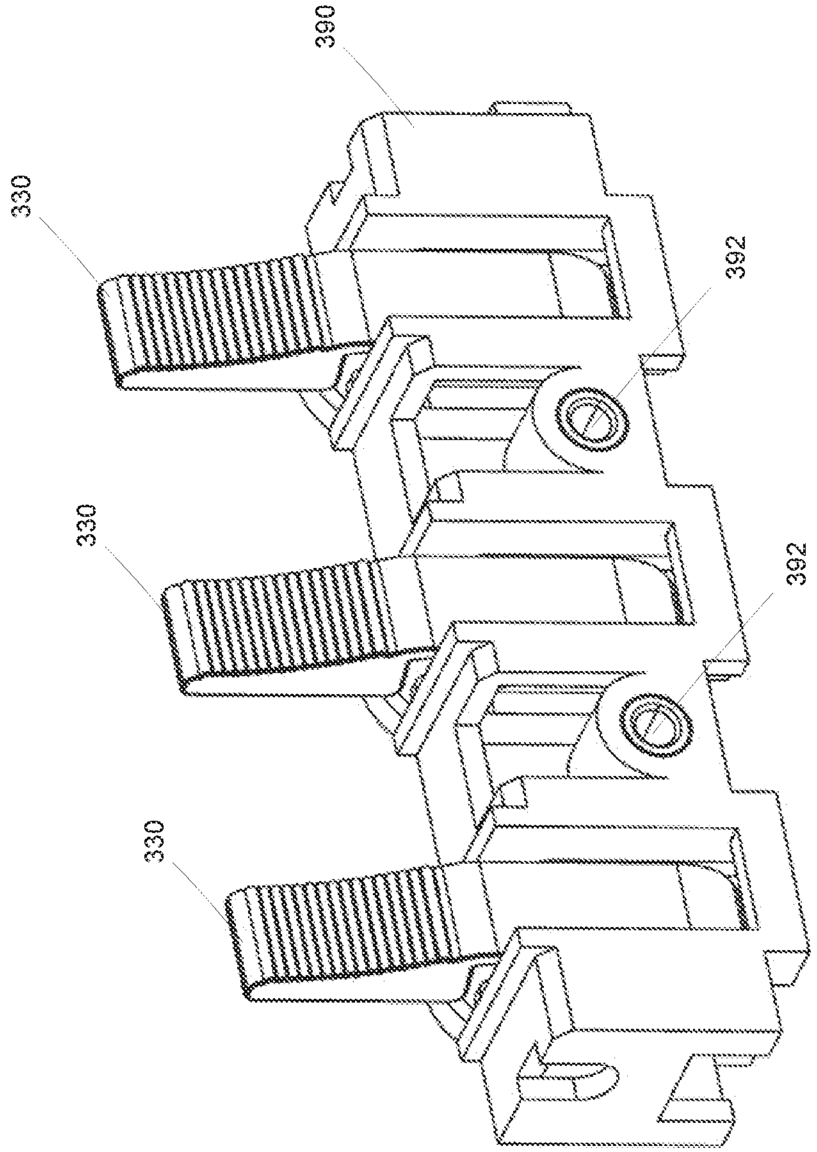
FIG. 17 is an isometric view of a lock lever assembly according to a representative embodiment.

As shown in FIG. 16, the relay board 364 can be secured to the outlet board 362 with suitable mounting hardware, such as spacers or standoffs 384. In some embodiments, the latch levers 330 can be mounted in a lever bracket 390 which is fastened to the front panel 322 with suitable fasteners (not shown) extending through mounting holes 386 formed through the second side panel 374. With further reference to FIG. 17, each lever bracket 390 can support three latch levers 330; however, the bracket can be configured to support more or fewer latch levers 330. In some embodiments, the lever bracket 390 can comprise molded plastic, for example. The bracket 390 can include threaded inserts 392 to facilitate mounting the assembly to the front panel 322.

The latch levers 330 are substantially the same as latch levers 130 and thus their construction is described more fully above with respect to FIGS. 8 and 9. As with the previous embodiments, each latch lever 330 can pivot about a common shaft or pivot about a separate shaft for each lever. Furthermore, each latch lever 330 can be urged toward the latched position with a corresponding resilient member, such as a coil compression spring, positioned between the latch lever 330 and the lever bracket 390 in an arrangement similar to that shown in FIG. 8, for example.

Figure 18:
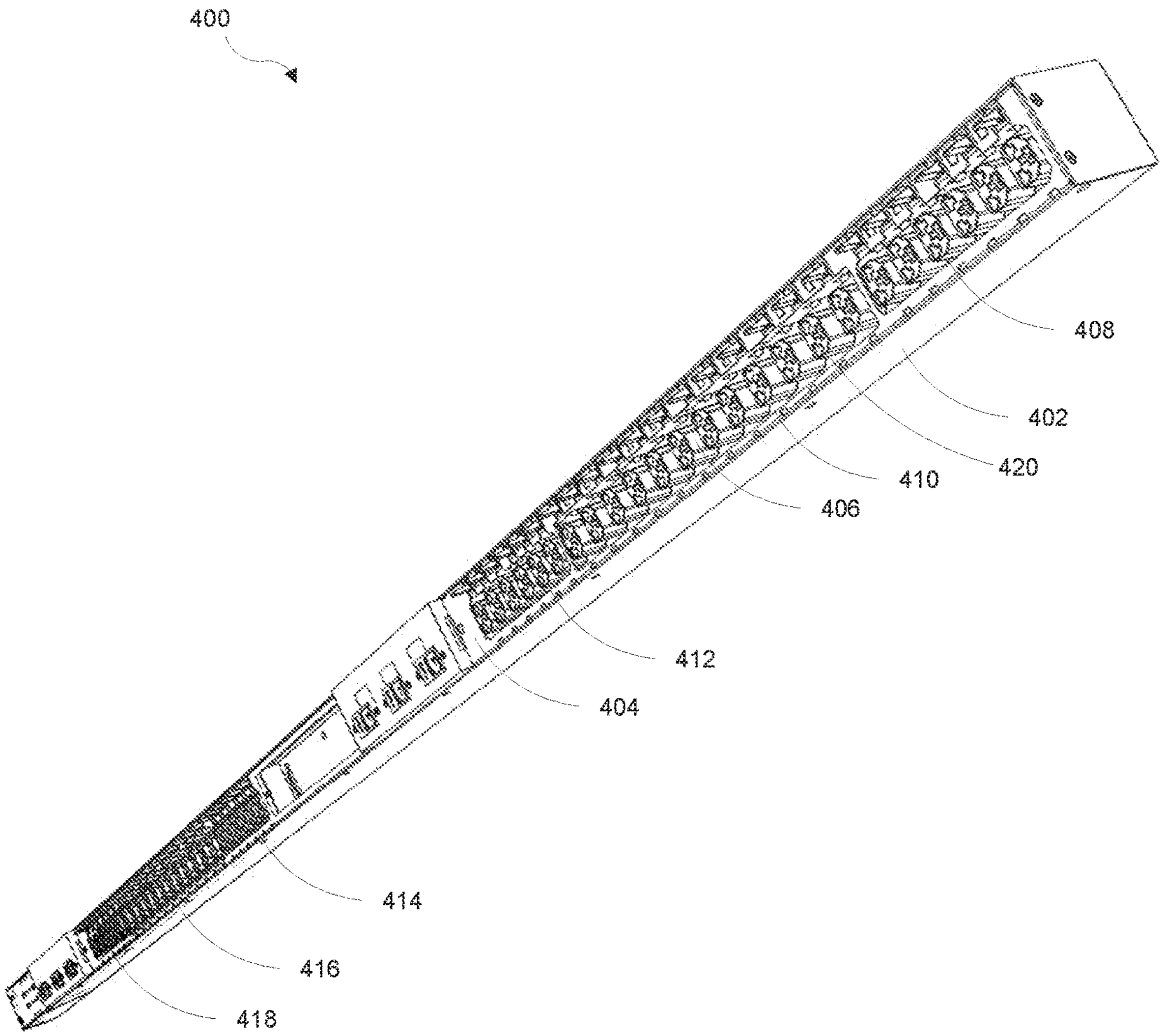
FIG. 18 is an illustration of a power distribution unit incorporating locking combination outlets in accordance with another embodiment of the disclosed technology.

FIG. 18 illustrates a power distribution unit 400 incorporating locking combination outlets in accordance with embodiments of the disclosed technology. The PDU 400 can include a housing 402 having a front panel 404. In some embodiments, the front panel 404 comprises a single panel extending substantially the entire length of the PDU 400. In some embodiments, the PDU can include various combinations of C13, C19, combination outlets and/or other suitable outlet types. The PDU can include any suitable number of outlets arranged in any suitable orientation, pattern, and/or array. As shown in the depicted embodiment, PDU 400 can include 48 combination outlets 406. The combination outlets 406 are substantially the same as combination outlets 126 and are thus described more fully above with respect to FIGS. 6A and 6B.

The outlets 406 can be spaced apart to accommodate different plug types. For example, the outlets 406 associated with apertures 408, 412, 414, and 418 can be spaced apart to accommodate C14 plugs while the outlets associated with apertures 410 and 416 can be spaced further apart to accommodate both C14 and C20 plugs. See FIG. 7 for suitable outlet spacings, for example.

Figure 19:
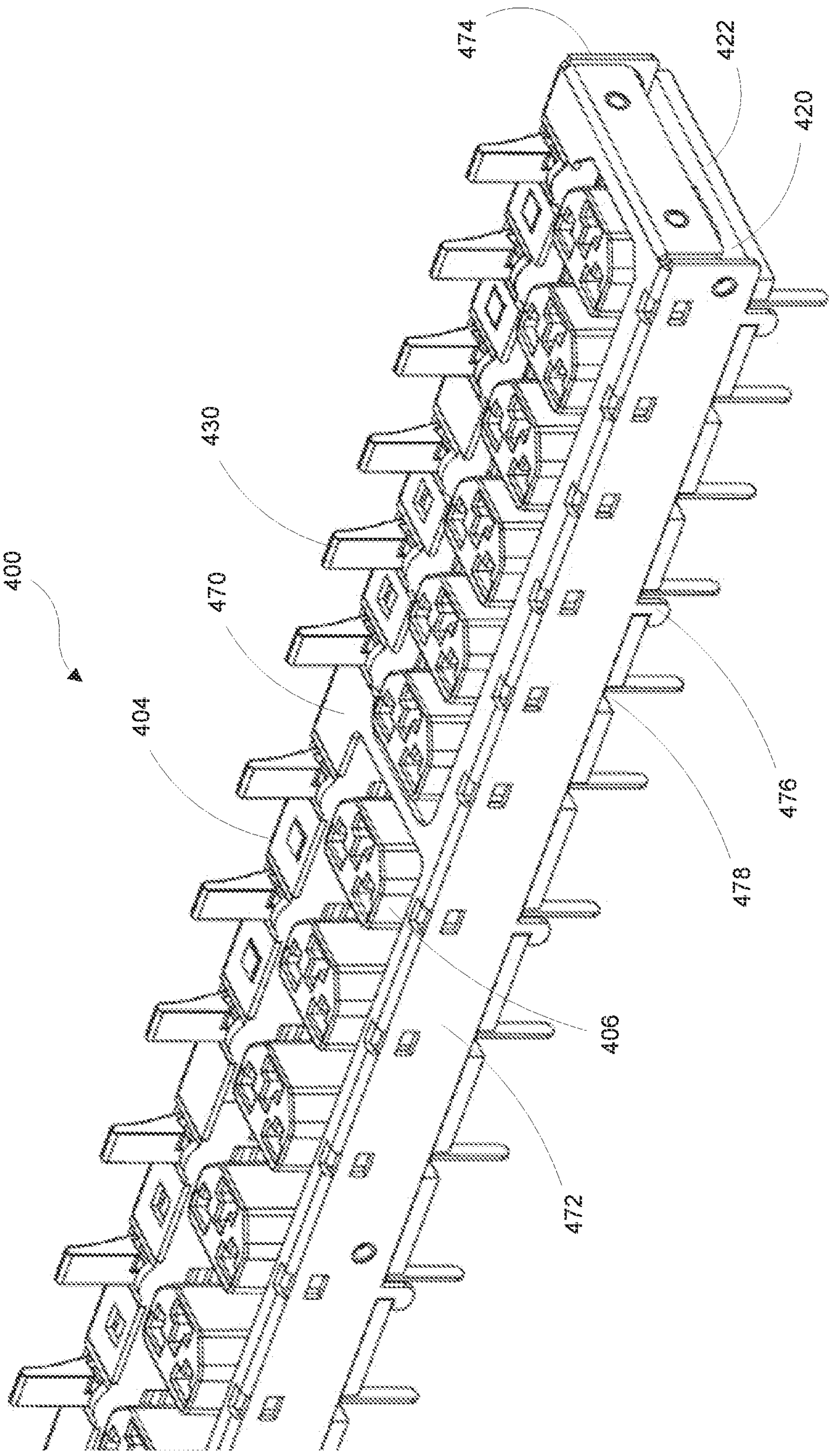
FIG. 19 is a partial isometric view of the power distribution unit shown in FIG. 18 as viewed from the top and opposite the levers.

In some embodiments, the PDU 400 includes a base surface 420 from which the outlet cores 406 extend. The base surface 420 can be the surface of a PCB, such as an outlet board 422 (FIG. 19). As with the foregoing embodiments described herein, the outlets 406 have an unobstructed space between adjacent outlet cores, as shown. Each outlet core 406 can be mounted to the outlet board 422 in a similar manner to that described above with respect to FIG. 5. Accordingly, the outlet cores 406 can be mounted using suitable fasteners. Each outlet 406 also includes terminals similar to terminals 138 and 142, as shown and described with respect to FIG. 5

With reference to FIG. 19, a latch lever 430 is positioned adjacent each one of the outlets 406. Each latch lever 430 is moveable (e.g., pivotable) between a latch position (e.g., first position) whereby a mating plug (e.g., plugs 190 and 192 in FIG. 10) can be inserted into the PDU 400 and subsequently retained therein, and an unlatch position (e.g., second position) whereby the mating plug can be removed from the PDU 400.

The latch levers 430 are substantially the same as latch levers 130 and thus their construction is described more fully above with respect to FIGS. 8 and 9. In some embodiments, the latch levers 430 can be mounted in the PDU 400 with an arrangement similar to that described above with respect to FIG. 16.

The front panel 404 can include a face portion 470 with first and second side panel portions 472 and 474, respectively. The first and second side panels 472 and 474 can each include multiple hooks 476 positioned to engage corresponding notches 478 along the edges of PCB 422, thereby retaining the PCB 422 relative to the front panel 404.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention. It will be noted that various advantages described herein are not exhaustive or exclusive, and numerous different advantages and efficiencies may be achieved, as will be recognized by one of skill in the art.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. An outlet module, comprising:

a module housing comprising a base surface and a sidewall extending therefrom to at least partially surround an interior region;

at least one outlet core extending from the base surface; and at least one latch lever movably coupled relative to the sidewall and adjacent to said at least one outlet core, said at least one latch lever movable between a first position, wherein the at least one latch lever is capable of engaging a mating plug for said at least one outlet core, and a second position, wherein the at least one latch lever is disengaged from the mating plug. and wherein the at least one latch lever is pivotably coupled to the sidewall outside the interior region and includes a tooth portion extending into the interior region through a corresponding aperture in said sidewall.

2. The outlet module of claim 1, wherein the at least one latch lever comprises multiple latch levers, said at least one outlet core comprises multiple outlet cores. and wherein each of the multiple latch levers pivots about a common pivot shaft.

3. The outlet module of claim 1, wherein each of the multiple outlet cores comprises an individual outlet core separate from the base surface.

4. The outlet module of claim 1, wherein at least the base surface and the sidewall comprise an integrally molded unitary body.

5. The outlet module of claim 1, wherein said tooth portion is positioned to engage the mating plug when the at least one latch lever is in the first position.

6. The outlet module of claim 1, further comprising a resilient member positioned between the sidewall and the at least one latch lever to bias the at least one latch lever toward the first position.

7. The outlet module of claim 6, wherein the resilient member is a coil compression spring positioned with respect to a pivot shaft to bias the tooth portion of the at least one latch lever toward the first.

8. The outlet module of claim 6, wherein the at least one latch lever comprises a release tab and a pivot bore positioned therebetween, and wherein the resilient member is positioned between the release tab and the pivot bore.

9. The outlet module of claim 1, wherein the multiple outlet cores comprises at least one IEC C13 outlet core.

10. The outlet module of claim 1, wherein the multiple-said at least one outlet core comprises at least one combination outlet core comprising:

a plurality of apertures configured to receive mating terminals corresponding to both an IEC C14 connector and an IEC C20 connector, the combination outlet core having an outer surface configured to mate with an IEC C14 connector; and a plurality of electrical terminals each positioned in a corresponding one of the apertures and configured to connect with the mating terminals corresponding to both an IEC C14 connector and an IEC C20 connector.

11. The outlet module of claim 10, wherein the plurality of apertures each comprise at least two intersecting crosswise slots.

12. The outlet module of claim 11, wherein the plurality of apertures each have a T-shaped configuration and the combination outlet core has an outer surface configured as a C13 outlet to mate with a C14 plug.

13. The outlet module of claim 1, wherein the at least one latch lever is pivotably coupled to the sidewall outside the interior region.

14. An outlet module, comprising:

a module housing comprising a base surface and a sidewall extending therefrom to at least partially surround an interior region, wherein at least the base surface and the sidewall comprise an integrally molded unitary body;

multiple outlet cores extending from the base surface;

multiple latch levers pivotably coupled to the sidewall outside the interior region, wherein each latch lever is positioned adjacent a corresponding one of the multiple outlet cores and moveable between a latch position and an unlatch position, each latch lever including a tooth portion extending into the interior region through a corresponding aperture in said sidewall; and multiple resilient members, each positioned between the sidewall and a corresponding one of the multiple latch levers to bias the corresponding latch lever toward the latch position.

15. The outlet module of claim 14, wherein each of the multiple latch levers pivots about a common pivot shaft captured in a PDU housing when the outlet module is installed therein.

16. The outlet module of claim 14, wherein each of the multiple outlet cores comprises a separate outlet core fastened to the base surface.

17. The outlet module of claim 14, wherein each latch lever is positioned to engage a mating plug when the latch lever is in the latch position.

18. The outlet module of claim 14, wherein each latch lever comprises a release tab, a tooth portion, and a pivot bore positioned therebetween, and wherein the corresponding resilient member is positioned between the release tab and the pivot bore.

19. The outlet module of claim 14, wherein the multiple outlet cores comprises at least one combination outlet core comprising:

a plurality of apertures configured to receive mating terminals corresponding to both an IEC C14 connector and an IEC C20 connector, the combination outlet core having an outer surface configured to mate with an IEC C14 connector; and a plurality of electrical terminals each positioned in a corresponding one of the apertures and configured to connect with the mating terminals corresponding to both an IEC C14 connector and an IEC C20 connector.

20. The outlet module of claim 19, wherein the plurality of apertures each comprise at least two intersecting crosswise slots configured to accept terminals of a C20 plug and terminals of a C20 plug.

21. The outlet module of claim 20, wherein the plurality of apertures each have a T-shaped configuration.

22. A power distribution unit, comprising:

a housing;

a power input coupled with the housing and connectable to an external power source; and at least one outlet module located at least partially within the housing and connected to the power input, the at least one outlet module comprising:

a module housing comprising a base surface and a sidewall extending therefrom to at least partially surround an interior region;

multiple outlet cores extending from the base surface, wherein each of the multiple outlet cores comprises a separate outlet core fastened to the base surface; and multiple latch levers pivotably coupled to the sidewall outside the interior region, wherein each latch lever is positioned adjacent a corresponding one of the multiple outlet cores and moveable between an unlatch position and a latch position, wherein the latch lever is positioned to engage a mating plug when the latch lever is in the latch position, each latch lever being pivotably coupled to the sidewall outside the interior region and including a tooth portion extending into the interior region through a corresponding aperture in said sidewall.

23. The power distribution unit of claim 22, wherein each of the multiple outlet cores comprises a separate outlet core fastened to the base surface.

24. The power distribution unit of claim 22, further comprising multiple resilient members, each positioned between the sidewall and a corresponding one of the multiple latch levers to bias the corresponding latch lever toward the latch position, each resilient member comprising a coil compression spring positioned with respect to a pivot shaft to bias the tooth portion of the corresponding latch lever toward the latch position.

25. The power distribution unit of claim 24, wherein each latch lever further comprises a release tab, and a pivot bore positioned therebetween, and wherein the corresponding resilient member is positioned between the release tab and the pivot bore.

26. The power distribution unit of claim 22, wherein the multiple outlet cores comprises at least one combination outlet core comprising:

a plurality of apertures configured to receive mating terminals corresponding to both an IEC C14 connector and an IEC C20 connector, the combination outlet core having an outer surface configured to mate with an IEC C14 connector and having an envelope of a C13 outlet; and a plurality of electrical terminals each positioned in a corresponding one of the apertures and configured to connect with the mating terminals corresponding to both an IEC C14 connector and an IEC C20 connector.

27. The power distribution unit of claim 22, wherein the multiple latch levers are each pivotably coupled to the sidewall outside the interior region.

* * * * *